United States Patent
Tazume et al.

(10) Patent No.: US 11,869,370 B2
(45) Date of Patent: Jan. 9, 2024

(54) CONTROL METHOD FOR UNMANNED AERIAL VEHICLE, MANAGEMENT METHOD, CONTROL DEVICE, MANAGEMENT DEVICE, AND UNMANNED AERIAL VEHICLE SYSTEM

(71) Applicant: Rakuten Group, Inc., Tokyo (JP)

(72) Inventors: Toshiaki Tazume, Tokyo (JP); Hayato Mizukami, Tokyo (JP); Qingnan Zhou, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 334 days.

(21) Appl. No.: 16/756,165

(22) PCT Filed: Dec. 14, 2018

(86) PCT No.: PCT/JP2018/046173
§ 371 (c)(1),
(2) Date: Apr. 15, 2020

(87) PCT Pub. No.: WO2020/121530
PCT Pub. Date: Jun. 18, 2020

(65) Prior Publication Data
US 2021/0217316 A1    Jul. 15, 2021

(51) Int. Cl.
*G08G 5/00* (2006.01)
*B64C 39/02* (2023.01)
(Continued)

(52) U.S. Cl.
CPC ......... *G08G 5/0043* (2013.01); *B64C 39/024* (2013.01); *G05D 1/104* (2013.01);
(Continued)

(58) Field of Classification Search
CPC .. G08G 5/0043; G08G 5/0013; G08G 5/0026; G08G 5/003; G08G 5/0082;
(Continued)

(56) References Cited

U.S. PATENT DOCUMENTS

2012/0215434 A1 * 8/2012 Subbu ................. G08G 5/0013
701/120
2014/0032034 A1 * 1/2014 Raptopoulos ...... H04B 7/18506
701/25

(Continued)

FOREIGN PATENT DOCUMENTS

JP    2012-174266 A    9/2012
JP    2014-181034 A    9/2014
(Continued)

OTHER PUBLICATIONS

International Search Report for PCT/JP2018/046173 dated Mar. 19, 2019 [PCT/ISA/210].

*Primary Examiner* — Peter D Nolan
*Assistant Examiner* — Peter Y Ning
(74) *Attorney, Agent, or Firm* — Sughrue Mion, PLLC

(57) ABSTRACT

In an unmanned aerial vehicle system S, a target position Pt to which UAV 1a is headed among a plurality of UAVs 1 is determined on the basis of a position of each of a plurality of ports 2, and the UAV 1a is controlled to fly toward the target position Pt. And then, a port 2x to be used for landing of the UAV 1a is determined on the basis of a reservation status of each of the plurality of ports 2 by the other UAV 1 different from the UAV 1a among the plurality of the UAVs 1 while the UAV 1a is flying toward the target position Pt, and the UAV 1a is controlled to fly toward the determined port 2x.

31 Claims, 17 Drawing Sheets

(51) Int. Cl.
*G05D 1/10* (2006.01)
*G06Q 10/02* (2012.01)
*G06Q 10/0835* (2023.01)
*B64U 10/13* (2023.01)

(52) U.S. Cl.
CPC ....... *G06Q 10/02* (2013.01); *G06Q 10/08355* (2013.01); *G08G 5/003* (2013.01); *G08G 5/0013* (2013.01); *G08G 5/0026* (2013.01); *G08G 5/0082* (2013.01); *B64U 10/13* (2023.01); *B64U 2201/10* (2023.01)

(58) Field of Classification Search
CPC .... G08G 5/0034; G08G 5/0056; G08G 5/025; G08G 5/0039; G08G 5/0069; B64C 39/024; B64C 2201/027; B64C 2201/141; G05D 1/104; G06Q 10/02; G06Q 10/08355; G06Q 50/28; G06Q 50/10; G06Q 50/30
See application file for complete search history.

(56) References Cited

U.S. PATENT DOCUMENTS

| | | | |
|---|---|---|---|
| 2014/0088288 A1 | 3/2014 | Iwata et al. | |
| 2014/0288730 A1* | 9/2014 | Fucke | G05D 1/101 701/3 |
| 2016/0039542 A1* | 2/2016 | Wang | B64C 39/024 244/114 R |
| 2016/0068264 A1* | 3/2016 | Ganesh | G06Q 30/0641 701/4 |
| 2016/0328979 A1* | 11/2016 | Postrel | H04W 4/46 |
| 2017/0045894 A1* | 2/2017 | Canoy | G08G 5/0013 |
| 2017/0278409 A1* | 9/2017 | Johnson | G08G 5/0069 |
| 2017/0344000 A1* | 11/2017 | Krishnamoorthy | G08G 5/0013 |
| 2018/0068567 A1* | 3/2018 | Gong | G08G 5/0039 |
| 2018/0286256 A1* | 10/2018 | Yoshifuku | G07C 5/0808 |
| 2018/0290764 A1* | 10/2018 | McMillian | G08G 5/0026 |
| 2018/0357909 A1* | 12/2018 | Eyhorn | G08G 5/0034 |
| 2019/0019418 A1* | 1/2019 | Tantardini | G08G 5/0056 |
| 2019/0043368 A1* | 2/2019 | Priest | G08G 5/0069 |
| 2020/0250993 A1* | 8/2020 | Li | G08G 5/006 |
| 2021/0005091 A1* | 1/2021 | Raabe | G08G 5/0069 |

FOREIGN PATENT DOCUMENTS

| | | |
|---|---|---|
| JP | 2017-527479 A | 9/2017 |
| WO | 2017100579 A1 | 6/2017 |
| WO | 2018/155700 A1 | 8/2018 |

* cited by examiner

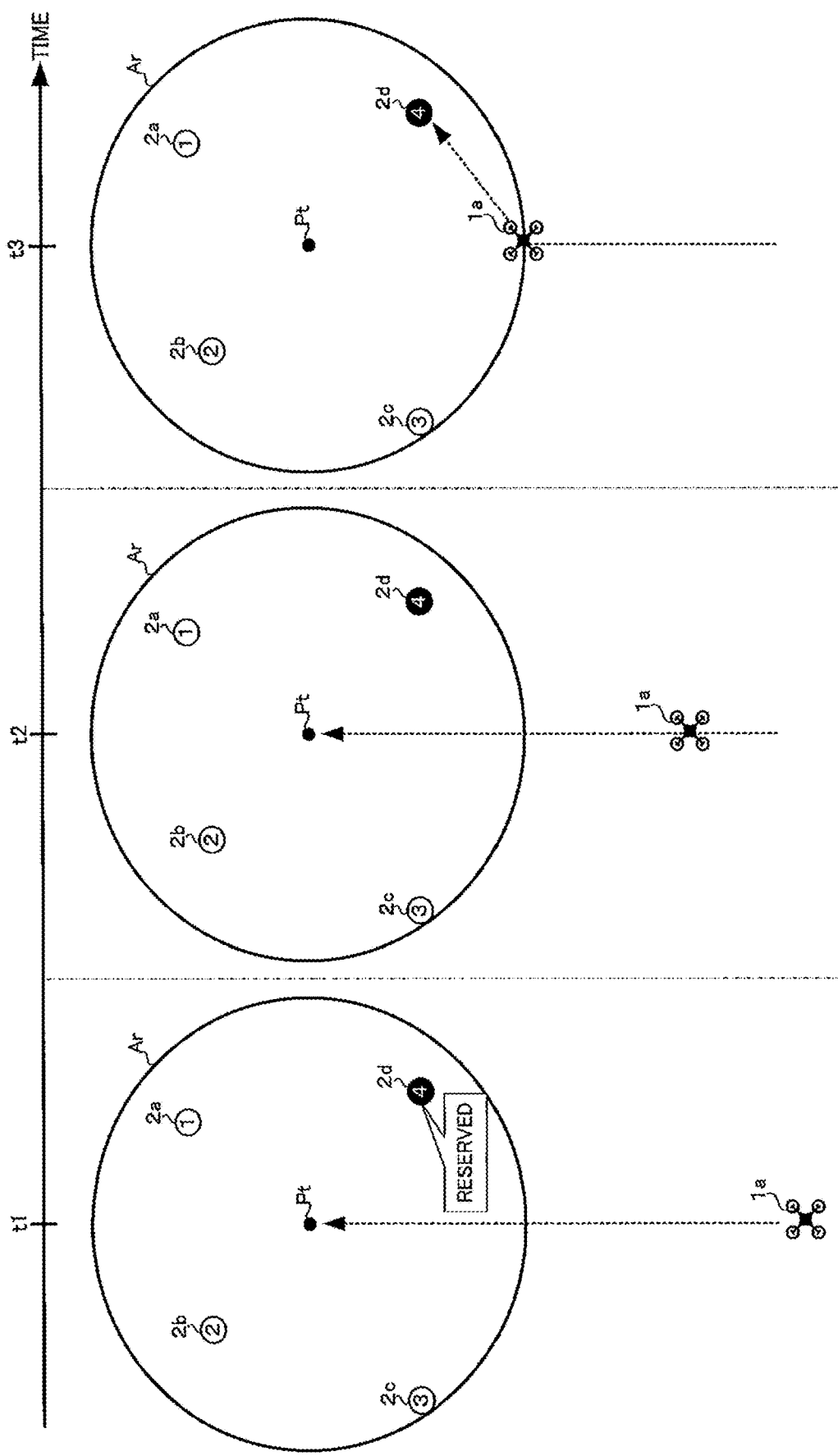

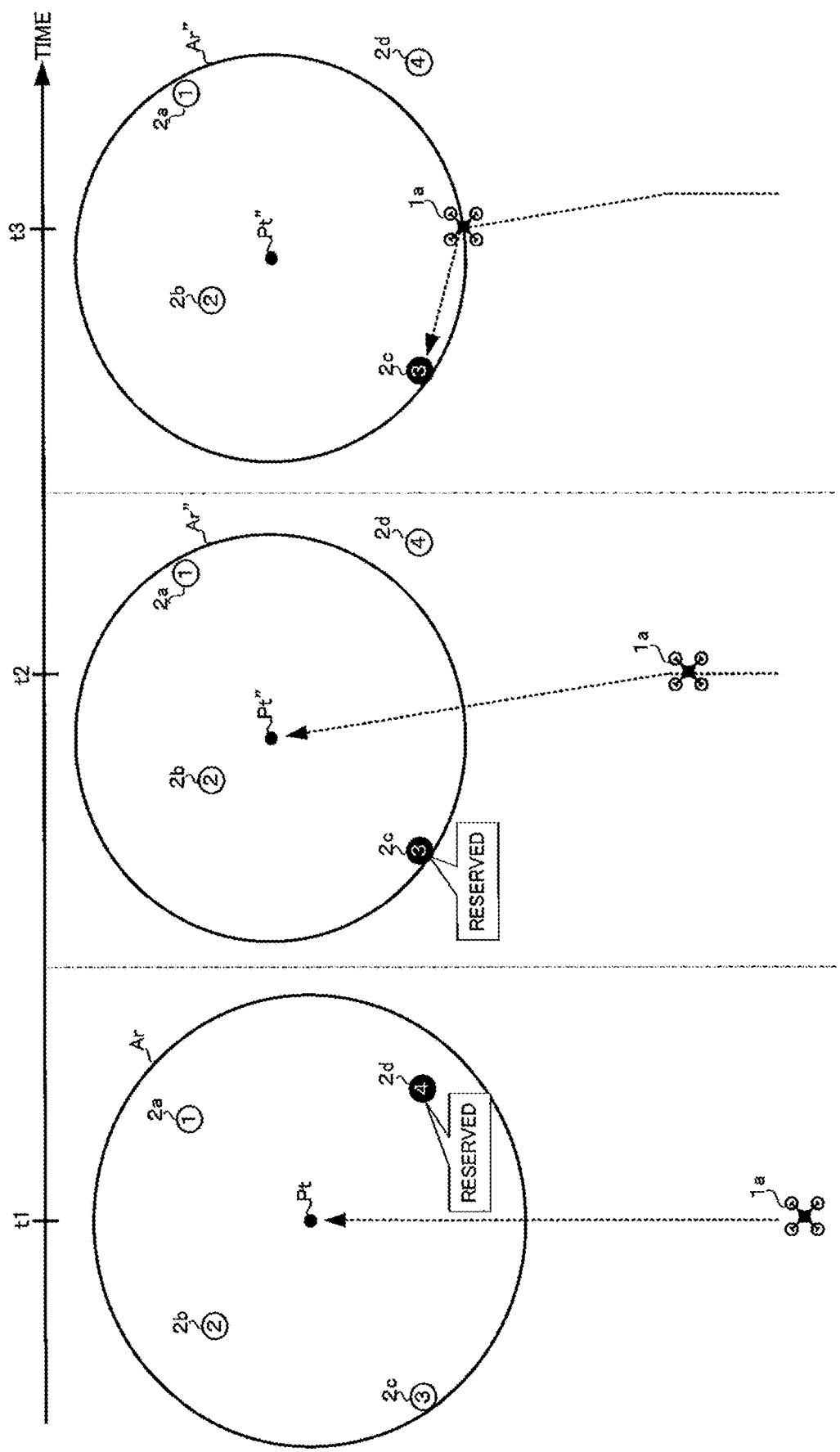

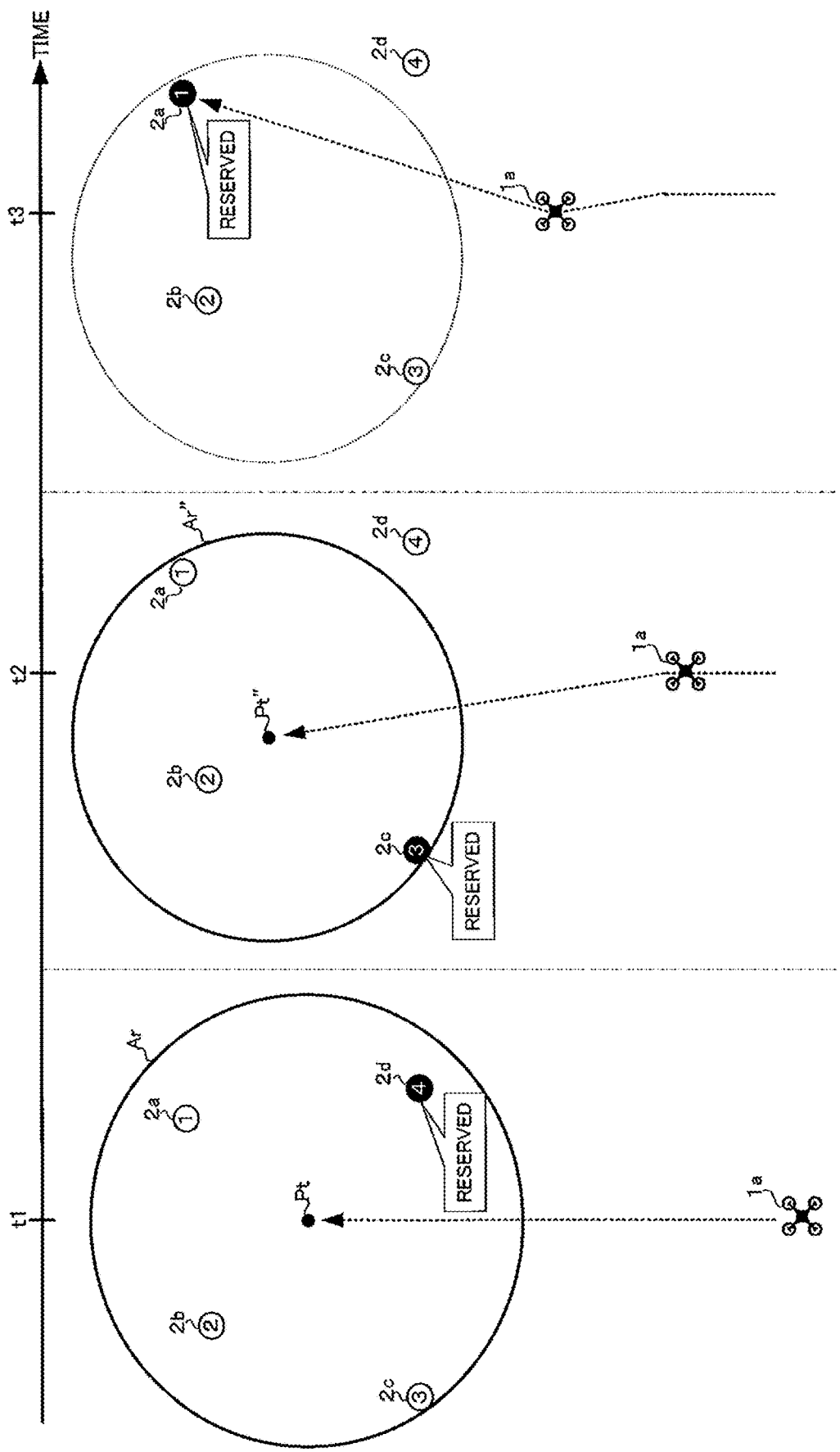

CONTROL METHOD FOR UNMANNED AERIAL VEHICLE, MANAGEMENT METHOD, CONTROL DEVICE, MANAGEMENT DEVICE, AND UNMANNED AERIAL VEHICLE SYSTEM

CROSS REFERENCE TO RELATED APPLICATIONS

This application is a National Stage of International Application No. PCT/JP2018/046173 filed Dec. 14, 2018.

TECHNICAL FIELD

The present invention relates to a technical field such as a system including a plurality of unmanned aerial vehicles and a plurality of take-off and landing facilities for an unmanned aerial vehicle.

BACKGROUND ART

In recent years, there are known systems for managing flight plans and flight positions of a plurality of unmanned aerial vehicles that autonomously fly between take-off and landing facilities as well as managing each take-off and landing facility (also called a port) where the unmanned aerial vehicle capable of autonomous flight take off and land (for example, Patent Literature 1). According to such a system, even in a case where the plurality of unmanned aerial vehicles use a take-off and landing facility jointly, it is possible to respond to changes in the flight plan of the unmanned aerial vehicle while ensuring safety at the take-off and landing facility.

CITATION LIST

Patent Literature

Patent Literature 1: WO 2018/155700

SUMMARY OF INVENTION

Technical Problem

As described above, in a case where the plurality of unmanned aerial vehicles jointly use a take-off and landing facility, the take-off and landing facility can be used safely and efficiently by performing reservation management for the take-off and landing facility. However, there is no technology proposed in which, in a case where there are a plurality of unmanned aerial vehicles and a plurality of take-off and landing facilities, each unmanned aerial vehicle and users are enabled to use a more suitable take-off and landing facility according to a reservation status of each of the plurality of take-off and landing facilities.

Therefore, one or more embodiments of the present invention have been made in view of the above circumstances, and are directed to provide a control method of an unmanned aerial vehicle, a management method, a control device, a management device, and an unmanned aerial vehicle system to enable the unmanned aerial vehicle or users to use a more suitable take-off and landing facility according to a reservation status of each of the plurality of take-off and landing facilities.

Solution to Problem

In response to the above issue, and in accordance with certain embodiments, a control method, executed by a system including a plurality of unmanned aerial vehicles and a plurality of take-off and landing facilities for an unmanned aerial vehicle, is provided. The control method includes: a first determination step of determining a target position to which a first unmanned aerial vehicle among the plurality of unmanned aerial vehicle is headed on the basis of a position of each of the plurality of take-off and landing facilities; a first control step of controlling the first unmanned aerial vehicle to fly toward the target position; a second determination step of determining, while the first unmanned aerial vehicle is flying toward the target position, a take-off and landing facility to be used for landing by the first unmanned aerial vehicle among the plurality of take-off and landing facilities on the basis of a reservation status of each of the plurality of take-off and landing facilities by a second unmanned aerial vehicle different from the first unmanned aerial vehicle among the plurality of unmanned aerial vehicles; and a second control step of controlling the first unmanned aerial vehicle to fly toward the take-off and landing facility determined in the second determination step. This makes it possible to determine the take-off and landing facility used for landing and to perform flight control of the unmanned aerial vehicle so that the flight efficiency is not lowered as much as possible for the unmanned aerial vehicle. Accordingly, it is possible to enable each unmanned aerial vehicle to use a more suitable take-off and landing facility according to a reservation status of each of a plurality of take-off and landing facilities, and the plurality of take-off and landing facilities can be used effectively.

The take-off and landing facility may be determined before the first unmanned aerial vehicle enters an area with the target position as a reference. This makes it possible to determine a take-off and landing facility to be used for landing by the unmanned aerial vehicle with a time margin during the flight of the unmanned aerial vehicle.

The take-off and landing facility may be determined when the first unmanned aerial vehicle reaches the area with the target position as a reference. This makes it possible to determine the take-off and landing facility to be used for landing by the unmanned aerial vehicle at a flight position as close as possible to the target position to which the unmanned aerial vehicle is headed. Thus, it is possible to increase the possibility that a more suitable take-off and landing facility is determined for the unmanned aerial vehicle.

The control method may further include a first setting step of setting the area centered on the target position, the area including a position of each of the plurality of take-off and landing facilities. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

The control method may further include a first setting step of setting the area centered on the target position, the area including a position of the take-off and landing facility already reserved as a take-off and landing facility to be used for landing by the first unmanned aerial vehicle, and a position of a take-off and landing facility with a usage priority higher than a usage priority of the already reserved take-off and landing facility. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

The control method may further include a first setting step of setting the area centered on the target position on the basis of the take-off and landing facility already reserved as a take-off and landing facility to be used for landing by the first unmanned aerial vehicle, and a distance between a position of a take-off and landing facility farthest away from the target position among one or more take-off and landing facilities with a usage priority higher than a usage priority of the take-off and landing facility and the target position. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

A take-off and landing facility to be used for landing by the first unmanned aerial vehicle may be determined on the basis of the reservation status of each of the plurality of take-off and landing facilities by the second unmanned aerial vehicles and the usage priority of each of the plurality of take-off and landing facilities by the first unmanned aerial vehicle. This makes it possible to enable each unmanned aerial vehicle to use a more suitable take-off and landing facility according to the reservation status and the usage priority of each of the plurality of take-off and landing facilities, and the plurality of take-off and landing facilities can be used effectively.

The control method may further include a second setting step of setting the usage priority for each of the plurality of take-off and landing facilities according to an instruction from a delivery requester or a recipient of a cargo delivered to the take-off and landing facility by the first unmanned aerial vehicle. This makes it possible to set the usage priority according to intention of the cargo delivery requester or the cargo recipient, and improve the convenience for the cargo delivery requester or the cargo recipient to use the take-off and landing facility.

The control method may further include a second setting step of setting the usage priority for each of the plurality of take-off and landing facilities according to an instruction from an operator of the first unmanned aerial vehicle. This makes it possible to set the usage priority according to intention of the operator of the unmanned aerial vehicle. Thus, it is possible to improve the convenience for the operator of the unmanned aerial vehicle to use the take-off and landing facility.

The control method may further include a second setting step of setting the usage priority for each of the plurality of take-off and landing facilities on the basis of a flight plan of the first unmanned aerial vehicle. This makes it possible to set the usage priority according to a flight plan of the unmanned aerial vehicle. Thus, it is possible to improve the convenience for the operator of the unmanned aerial vehicle to use the take-off and landing facility.

The control method may further include a first reservation step of reserving a first take-off and landing facility among the plurality of take-off and landing facilities as a take-off and landing facility to be used for landing by the first unmanned aerial vehicle before the first unmanned aerial vehicle flies on the basis of a reservation status of each of the plurality of take-off and landing facilities by the second unmanned aerial vehicle, and a usage priority of each of the plurality of take-off and landing facilities by the first unmanned aerial vehicle; and a second reservation step of reserving a second take-off and landing facility determined in the second determination step among the plurality of take-off and landing facilities, the second take-off and landing facility being different from the first take-off and landing facility, as a take-off and landing facility to be used for landing by the first unmanned aerial vehicle, instead of the first take-off and landing facility reserved in the first reservation step. This makes it possible to dynamically change the reservation to the take-off and landing facility that is more convenient.

In a case where a reservation status of each of the plurality of take-off and landing facilities by the second unmanned aerial vehicle is changed, the second take-off and landing facility may be reserved as a take-off and landing facility to be used for landing by the first unmanned aerial vehicle. This makes it possible to dynamically change the reservation to the take-off and landing facility for which a higher usage priority is set.

In a case where a reservation of a take-off and landing facility with a usage priority higher than a usage priority of the first take-off and landing facility reserved by the first unmanned aerial vehicle is canceled, the take-off and landing facility for which the reservation is canceled may be reserved as the second take-off and landing facility. This makes it possible to dynamically change the reservation to the take-off and landing facility for which a higher usage priority is set.

A gravity center of an n (n is an integer of 3 or more) polygon formed on the basis of a midpoint between positions of each of the plurality of take-off and landing facilities or the positions of the plurality of take-off and landing facilities may be determined as the target position. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

The target position may be determined on the basis of a position of the take-off and landing facility reserved by the first unmanned aerial vehicle, and a position of a take-off and landing facility with a usage priority higher than a usage priority of the reserved take-off and landing facility. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

In accordance with certain other embodiments, a management method, executed by a system including a plurality of unmanned aerial vehicles and a plurality of take-off and landing facilities for an unmanned aerial vehicle, is provided. The management method includes: an acquisition step of acquiring a usage priority of each of the plurality of take-off and landing facilities by a first unmanned aerial vehicle among the plurality of unmanned aerial vehicles; a first reservation step of reserving a first take-off and landing facility among the plurality of take-off and landing facilities as a take-off and landing facility to be used for landing by the first unmanned aerial vehicle on the basis of a reservation status of each of the plurality of take-off and landing facilities by a second unmanned aerial vehicle different from the first unmanned aerial vehicle among the plurality of unmanned aerial vehicles, and the usage priority; and a second reservation step of reserving, while the first unmanned aerial vehicle is flying, a second take-off and landing facility different from the first take-off and landing facility instead of the first take-off and landing facility reserved in the first reservation step among the plurality of take-off and landing facilities as a take-off and landing facility to be used for landing by the first unmanned aerial vehicle on the basis of a reservation status of each of the plurality of take-off and landing facilities by the second unmanned aerial vehicle and the usage priority. This makes it possible to dynamically change the reservation to the take-off and landing facility that is more convenient for the user of the take-off and landing facility. Accordingly, it is possible to enable the users to use a more suitable take-off and landing facility according to a reservation status of each of a plurality of take-off and landing facilities, and the plurality of take-off and landing facilities can be used effectively.

In a case where a reservation status of each of the plurality of take-off and landing facilities by the second unmanned aerial vehicle has changed, the second take-off and landing facility may be reserved as a take-off and landing facility to be used for landing by the first unmanned aerial vehicle. This makes it possible to dynamically change the reservation to the take-off and landing facility for which a higher usage priority is set.

In a case where a reservation of a take-off and landing facility with a usage priority higher than a usage priority of the first take-off and landing facility reserved by the first unmanned aerial vehicle is canceled, the take-off and landing facility for which the reservation is canceled may be reserved as the second take-off and landing facility. This makes it possible to dynamically change the reservation to the take-off and landing facility for which a higher usage priority is set.

The management method may further include a determination step of determining a target position to which the first unmanned aerial vehicle is headed on the basis of a position of each of the plurality of take-off and landing facilities. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

The second take-off and landing facility may be reserved before the first unmanned aerial vehicle enters an area with the target position as a reference. This makes it possible to reserve a take-off and landing facility to be used for landing by the unmanned aerial vehicle with a time margin during the flight of the unmanned aerial vehicle.

The take-off and landing facility may be reserved when the first unmanned aerial vehicle reaches the area with the target position as a reference. This makes it possible to reserve the take-off and landing facility to be used for landing by the unmanned aerial vehicle at a flight position as close as possible to the target position to which the unmanned aerial vehicle is headed. Thus, it is possible to increase the possibility that a more suitable take-off and landing facility is reserved for the user.

The management method may further include a first setting step of setting the area centered on the target position, the area including a position of each of the plurality of take-off and landing facilities. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

The management method may further include a first setting step of setting the area centered on the target position, the area including a position of the first take-off and landing facility reserved by the first unmanned aerial vehicle and a position of a take-off and landing facility with a usage priority higher than a usage priority of the first take-off and landing facility. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

The management method may further include a first setting step of setting the area centered on the target position on the basis of the first take-off and landing facility reserved by the first unmanned aerial vehicle, and a distance between a position of a take-off and landing facility farthest away from the target position among one or more take-off and landing facilities with a usage priority higher than a usage priority of the first take-off and landing facility and the target position. This makes it possible to set an appropriate area where the flight efficiency of the unmanned aerial vehicle is not lowered as much as possible, even in a case where any take-off and landing facility is used for landing by an unmanned aerial vehicle among the plurality of take-off and landing facilities.

A gravity center of an n (n is an integer of 3 or more) polygon formed on the basis of a midpoint between positions of the plurality of take-off and landing facilities or the positions of each of the plurality of take-off and landing facilities may be determined as the target position. This makes it possible to set an appropriate target position where the flight efficiency of the unmanned aerial vehicle is not lowered as much as possible, even in a case where any take-off and landing facility is used for landing by an unmanned aerial vehicle among the plurality of take-off and landing facilities.

The target position may be determined on the basis of a position of the first take-off and landing facility reserved by the first unmanned aerial vehicle, and a position of a take-off and landing facility with a usage priority higher than a usage priority of the first take-off and landing facility. This makes it possible to set an appropriate target position where the flight efficiency of the unmanned aerial vehicle is not lowered as much as possible, even in a case where any take-off and landing facility is used for landing by an unmanned aerial vehicle among the plurality of take-off and landing facilities.

The management method may further include a second setting step of setting the usage priority for each of the plurality of take-off and landing facilities according to an instruction from a delivery requester or a recipient of a cargo delivered to the take-off and landing facility by the first unmanned aerial vehicle. This makes it possible to set the usage priority according to intention of the cargo delivery requester or the cargo recipient, and improve the convenience for the cargo delivery requester or the cargo recipient to use the take-off and landing facility.

The management method may further include a second setting step of setting the usage priority for each of the plurality of take-off and landing facilities according to an instruction from an operator of the first unmanned aerial vehicle. This makes it possible to set the usage priority according to intention of the operator of the unmanned aerial vehicle. Thus, it is possible to improve the convenience for the operator of the unmanned aerial vehicle to use the take-off and landing facility.

The management method may further include a second setting step of setting the usage priority for each of the plurality of take-off and landing facilities on the basis of a flight plan of the first unmanned aerial vehicle. This makes it possible to set the usage priority according to a flight plan of the unmanned aerial vehicle. Thus, it is possible to improve the convenience for the operator of the unmanned aerial vehicle to use the take-off and landing facility.

The management method may further include a change step of changing a flight plan of the first unmanned aerial vehicle according to a reservation status of each of the plurality of take-off and landing facilities by the second unmanned aerial vehicle.

In accordance with certain other embodiments of the present invention, a control device, provided in a system including a plurality of unmanned aerial vehicles and a plurality of take-off and landing facilities for an unmanned aerial vehicle, is provided. The control device includes: a first determination unit which determines a target position to which a first unmanned aerial vehicle among the plurality of unmanned aerial vehicle is headed on the basis of a position of each of the plurality of take-off and landing facilities; a first control unit which controls the first unmanned aerial vehicle to fly toward the target position; an acquisition unit which acquires take-off and landing facility information indicating a take-off and landing facility determined from among the plurality of take-off and landing facilities on the basis of a reservation status of each of the plurality of take-off and landing facilities by a second unmanned aerial vehicle different from the first unmanned aerial vehicle among the plurality of unmanned aerial vehicles while the first unmanned aerial vehicle is flying to the target position; and a second control unit which controls the first unmanned aerial vehicle to fly toward the take-off and landing facility indicated by the take-off and landing facility information.

In accordance with certain other embodiments, a management device, provided in a system including a plurality of unmanned aerial vehicles and a plurality of take-off and landing facilities for an unmanned aerial vehicle, is provided. The management device includes: an acquisition unit which acquires a usage priority of each of the plurality of take-off and landing facilities by a first unmanned aerial vehicle among the plurality of unmanned aerial vehicles; a first reservation unit which reserves a first take-off and landing facility among the plurality of take-off and landing facilities as a take-off and landing facility to be used for landing by the first unmanned aerial vehicle on the basis of a reservation status of each of the plurality of take-off and landing facilities by a second unmanned aerial vehicle different from the first unmanned aerial vehicle among the plurality of unmanned aerial vehicles, and the usage priority; and a second reservation unit which reserves, while the first unmanned aerial vehicle is flying, a second take-off and landing facility different from the first take-off and landing facility among the plurality of take-off and landing facilities instead of the first take-off and landing facility reserved in the first reservation unit as a take-off and landing facility to be used for landing by the first unmanned aerial vehicle on the basis of a reservation status of each of the plurality of take-off and landing facilities by the second unmanned aerial vehicle, and the usage priority.

In accordance with certain other embodiments, an unmanned aerial vehicle system, which includes a plurality of unmanned aerial vehicles and a plurality of take-off and landing facilities for an unmanned aerial vehicle, is provided. The unmanned aerial vehicle system includes: a first determination unit which determines a target position to which a first unmanned aerial vehicle among the plurality of unmanned aerial vehicle is headed on the basis of a position of each of the plurality of take-off and landing facilities; a first control unit which controls the first unmanned aerial vehicle to fly toward the target position; a second determination unit which determines, while the first unmanned aerial vehicle is flying toward the target position, a take-off and landing facility to be used for landing by the first unmanned aerial vehicle among the plurality of take-off and landing facilities on the basis of a reservation status of each of the plurality of take-off and landing facilities by a second unmanned aerial vehicle different from the first unmanned aerial vehicle among the plurality of unmanned aerial vehicles; and a second control unit which controls the first unmanned aerial vehicle to fly toward the take-off and landing facility determined by the second determination unit.

In accordance with certain other embodiments, an unmanned aerial vehicle system, which includes a plurality of unmanned aerial vehicles and a plurality of take-off and landing facilities for an unmanned aerial vehicle, is provided. The unmanned aerial vehicle system includes: an acquisition unit which acquires a usage priority of each of the plurality of take-off and landing facilities by a first unmanned aerial vehicle among the plurality of unmanned aerial vehicles; a first reservation unit which reserves a first take-off and landing facility among the plurality of take-off and landing facilities as a take-off and landing facility to be used for landing by the first unmanned aerial vehicle on the basis of a reservation status of each of the plurality of take-off and landing facilities by a second unmanned aerial vehicle different from the first unmanned aerial vehicle among the plurality of unmanned aerial vehicles, and the usage priority; and a second reservation unit which reserves, while the first unmanned aerial vehicle is flying, a second take-off and landing facility different from the first take-off and landing facility among the plurality of take-off and landing facilities instead of the first take-off and landing facility reserved in the first reservation unit as a take-off and landing facility to be used for landing by the first unmanned aerial vehicle on the basis of a reservation status of each of the plurality of take-off and landing facilities by the second unmanned aerial vehicle and the usage priority.

Advantageous Effect of the Invention

According to one or more embodiments of the present invention, it is possible to enable each unmanned aerial vehicle or users to use a more suitable take-off and landing facility according to a reservation status of each of a plurality of take-off and landing facilities.

BRIEF DESCRIPTION OF THE DRAWINGS

FIG. 15 is a conceptual diagram illustrating time-series changes (an example 1) of a flight path of an UAV 1a that is flight-controlled.

FIG. 16 is a conceptual diagram illustrating time-series changes (an example 2) of a flight path of an UAV 1a that is flight-controlled.

FIG. 17 is a conceptual diagram illustrating time-series changes (an example 3) of a flight path of an UAV 1a that is flight-controlled.

DESCRIPTION OF EMBODIMENTS

Hereinafter, an unmanned aerial vehicle system according to an embodiment of the present invention will be described with reference to the drawings.

[1. Outline of Configuration and Operation of Unmanned Aerial Vehicle System S]

Figure 1:
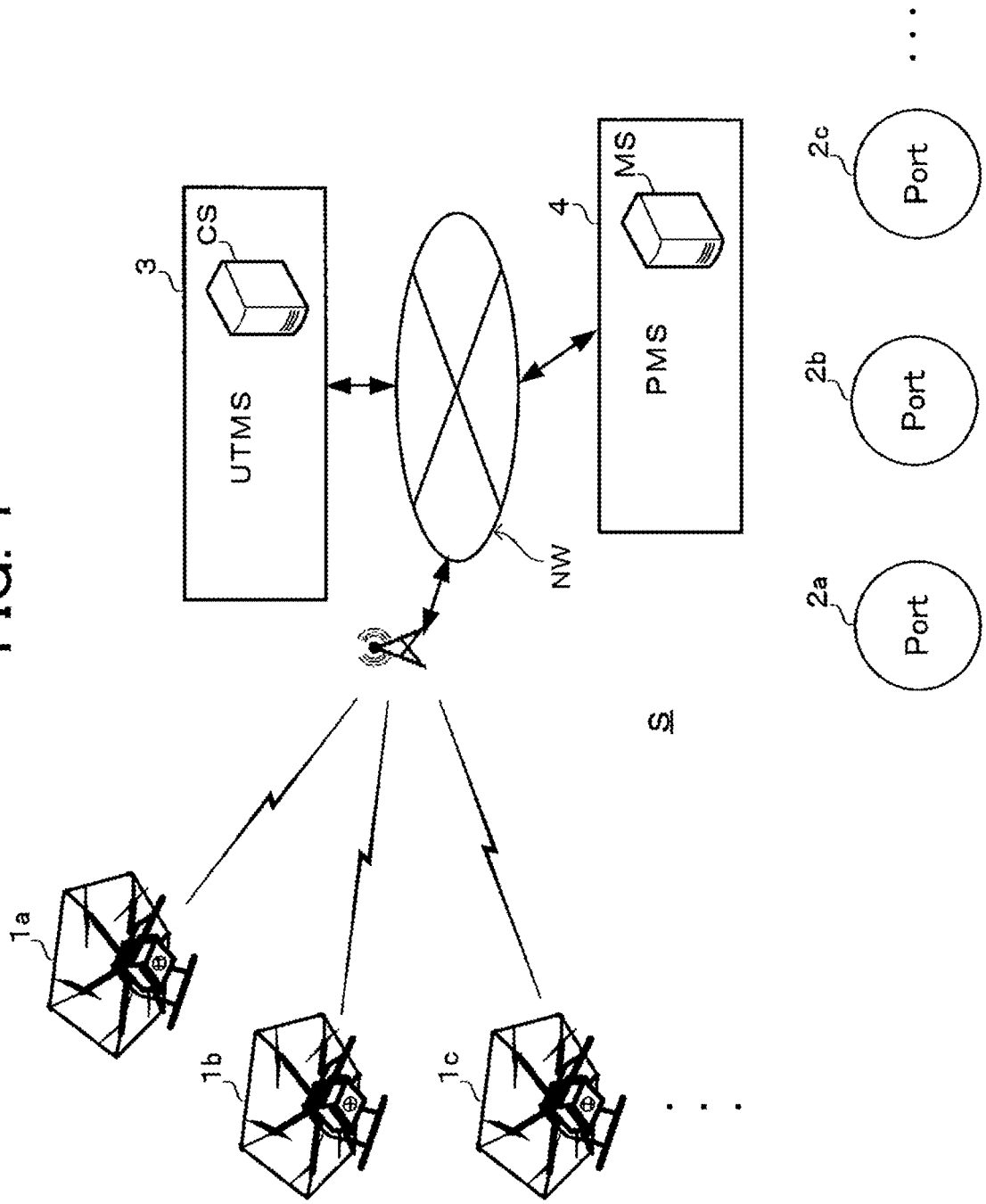
FIG. 1 is a diagram illustrating a schematic configuration example of an unmanned aerial vehicle system S.

First, the outline of the configuration and operation of the unmanned aerial vehicle system S according to this embodiment will be described with reference to FIG. 1. FIG. 1 is a diagram illustrating a schematic configuration example of the unmanned aerial vehicle system S. As illustrated in FIG. 1, the unmanned aerial vehicle system S includes a plurality of unmanned aerial vehicles (hereinafter, referred to as "UAV (Unmanned Aerial Vehicle)") 1a, 1b, 1c, . . . , a plurality of take-off and landing facilities for UAV (referred to as "port") 2a, 2b, 2c, . . . , a traffic management system (hereinafter, referred to as "UTMS (UAV Traffic Management System)") 3, and a port management system (hereinafter, referred to as "PMS (Port Management System)") 4. In the following description, the plurality of UAVs 1a, 1b, . . . are collectively referred to as UAV 1, and a plurality of ports 2a, 2b, . . . are collectively referred to as port 2. The UAV 1, the UTMS 3, and the PMS 4 can communicate with each other via a communication network NW. The communication network NW includes, for example, the Internet, a mobile communication network, a radio base station thereof, and the like. The UTMS 3 and the PMS 4 execute various processes in cooperation with each other via the communication network NW. Incidentally, the UTMS 3 and the PMS 4 may be configured as one management system.

The UAV 1 can fly in the atmosphere by remote control or fly autonomously. The UAV 1 is also called a drone or a multi-copter. The UAV 1 is used, for example, for cargo delivery, ground condition observation, or the like. When the UAV 1 is used to deliver cargo, the cargo is delivered from the UAV 1 to a recipient at the port 2 where the UAV 1 lands. Moreover, when a storage box (delivery box) for temporarily storing cargo is installed at the port 2, the cargo is transferred from the UAV 1 to the storage box. Moreover, when an unmanned ground vehicle (hereinafter referred to as "UGV (Unmanned Ground Vehicle)") that travels on the ground to deliver the cargo is waiting at the port 2, the cargo is delivered from the UAV 1 to the UGV. Incidentally, the UAV 1 is managed by a GCS (Ground Control Station) and can be remotely operated by an operator from the ground. For example, the GCS is installed in a control terminal that can be connected to the communication network NW as an application. In this case, the operator is, for example, a person who operates the control terminal or a controller provided in the control terminal. Alternatively, the GCS may be systemized by a server or the like. In this case, the operator is, for example, a system manager or a controller provided in the server.

The UTMS 3 includes, for example, one or more servers including a control server CS, and the like. The control server CS is an example of a control device. The UTMS 3 manages traffics and flights of the plurality of UAVs 1. The traffic management of the UAV 1 includes management of a traffic plan before flight of the UAV 1 and management and control of a flight status of the UAV 1 in flight. The traffic plan before flight of the UAV 1 is a flight plan and the like including a scheduled route from a departure place to a destination (or a destination area) of the UAV 1. The flight plan may include a scheduled passage time at each point on the scheduled route and a scheduled landing time. The management and control of the flight status of the UAV 1 is performed on the basis of aircraft information of the UAV 1. The aircraft information of the UAV 1 includes at least position information of the UAV 1. The position information of the UAV 1 indicates the current position (for example, latitude, longitude, and altitude) of the UAV 1. The current position of the UAV 1 is the flight position of the UAV 1 in flight. The aircraft information of the UAV 1 may include speed information and the like of the UAV 1. The speed information of the UAV 1 indicates a flight speed of the UAV 1. For example, when a flight plan application for the UAV 1 is received from the GCS, the UTMS 3 determines whether the flight plan satisfies a predetermined standard, and if the flight plan satisfies the standard, the flight plan is approved. Moreover, the UTMS 3 performs air traffic control such as giving information and instructions to the UAV 1. Examples of information given from the UTMS 3 to the UAV 1 include information on a safe flight path, information on a flight possible area, and the like. Further, the UTMS 3 may change the flight plan of the UAV 1 depending on a reservation status of each of the plurality of ports 2 managed by the PMS 4.

The PMS 4 includes, for example, one or more servers including a management server MS, and the like. The management server MS is an example of a management device. The PMS 4 manages a plurality of ports 2. The management of the port 2 includes a reservation management of the port 2. The management of the port 2 is performed on the basis of a port ID of the port 2, position information of the port 2, reservation information of the port 2, and the like. The port ID is identification information for identifying the port 2. The position information of the port 2 indicates the position (installation position) of the port 2. The position of the port 2 is represented by latitude and longitude, for example. The reservation information of the port 2 includes the aircraft ID of the UAV 1 that reserved the port 2 (landing reservation), the reservation date and time, and the like. The aircraft ID is identification information for identifying the UAV 1. Incidentally, one PMS 4 may manage one port 2 (that is, one-to-one correspondence), or one PMS 4 may manage a plurality of ports 2 (that is, one-to-N correspondence). When one PMS 4 manages one port 2, a plurality of sets (combinations) of PMSs 4 and the port 2 are provided. Alternatively, a plurality of PMSs 4 may exist. In this case, the plurality of PMSs 4 manages one or a plurality of ports. Moreover, when the UTMS 3 and the PMS 4 are configured as one management system, the control server CS and the management server MS may be configured integrally.

Figure 2:
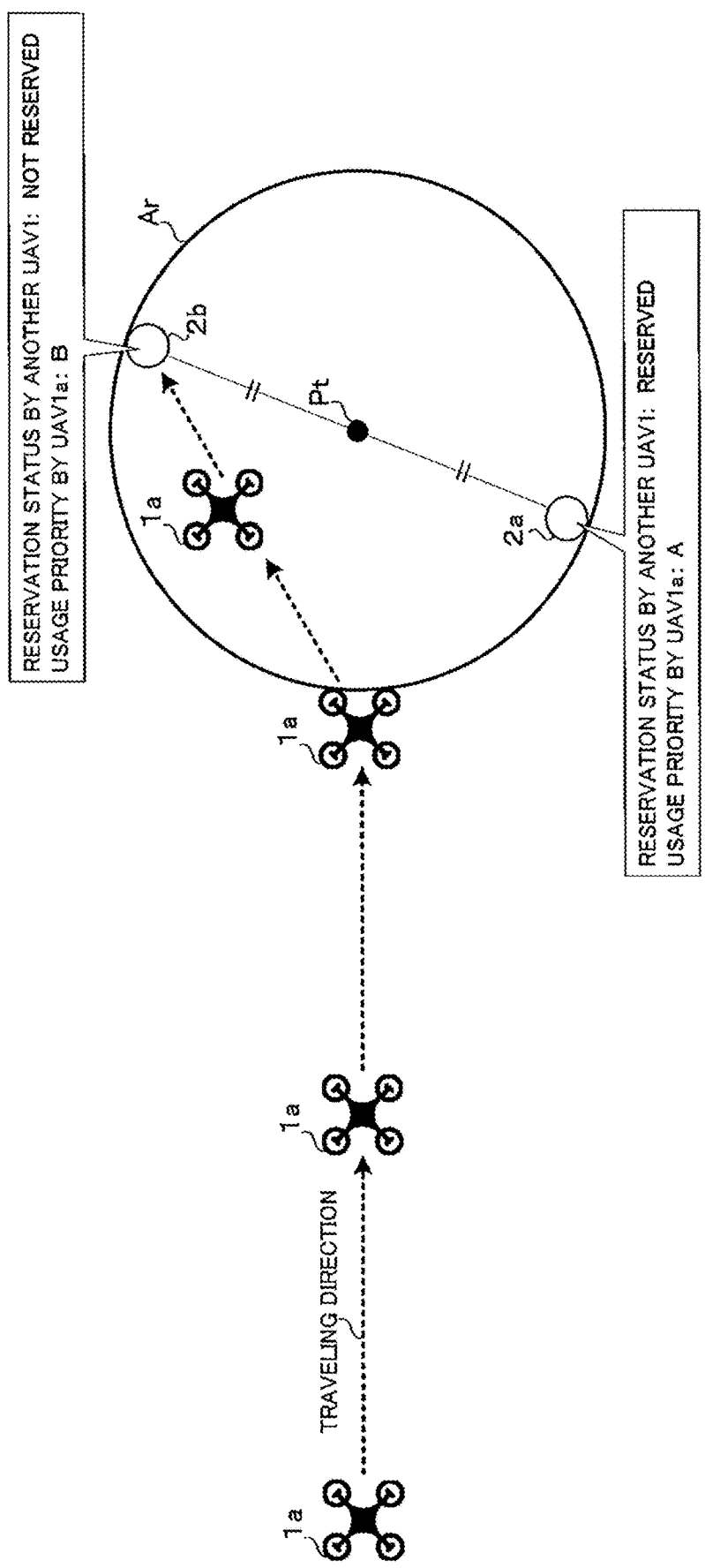
FIG. 2 is a conceptual diagram illustrating a state where an UAV 1a flies from a departure place to a destination in an unmanned aerial vehicle system S.

FIG. 2 is a conceptual diagram illustrating a state where the UAV 1a flies from a departure place to a destination in the unmanned aerial vehicle system S. In the example of FIG. 2, first, a target position Pt to which the UAV 1a (an example of the first UAV 1) is headed is determined on the basis of respective positions of the ports 2a and 2b. This determination is performed by, for example, the control server CS. The target position Pt illustrated in FIG. 2 is at the midpoint between the respective positions of the port 2a and the port 2b. Incidentally, the target position Pt is represented by latitude and longitude, for example. Next, the UAV 1a is controlled to fly toward the determined target position Pt. This control (flight control of the UAV 1a) is performed by, for example, instructing the target position Pt from the control server CS to the UAV 1a. Next, before the UAV 1a enters an area Ar based on the determined target position Pt, the port 2b (destination) to be used for landing by the UAV 1a is determined in the ports 2a and 2b on the basis of the reservation status of each of the ports 2a and 2b by the other UAV 1 (second UAV 1) different from the UAV 1a (for example, whether the reservation is made for each time zone). This determination is performed by, for example, the management server MS. In the example of FIG. 2, in the ports 2a and 2b, the port 2b that is not reserved by another UAV 1 within a predetermined time before and after the reservation date and time by the UAV 1a (that is, the reservation date and time is not included within the predetermined time) is determined. Then, when the UAV 1a reaches the area Ar (in other words, enters), the UAV 1a is controlled to fly toward the port 2b. This control (flight control of the UAV 1a) is performed by, for example, instructing the position of the port 2b from the control server CS to the UAV 1a. Incidentally, the determination of the target position Pt and the control of the UAV 1a may be performed by a control unit in the management server MS, the GCS, or the UAV 1. Moreover, the determination of the port 2 may be performed by the control unit in the control server CS, the GCS, or the UAV 1.

Moreover, in the example of FIG. 2, a usage priority by the UAV 1a is set for each of the ports 2a and 2b. The usage priority is information indicating which port should be preferentially used by the UAV 1a among the plurality of ports 2, and can also be referred to as a priority order used for landing by the UAV 1a. The usage priority may be expressed in alphabets or numbers, but in the example of FIG. 2, it is expressed by A and B, with A being a usage priority higher than B. The usage priority "A" of the port 2a by the UAV 1a is set higher than the usage priority "B" of the port 2b by the UAV 1a, but the reservation status of the port 2a by the other UAV 1 is reserved. Therefore, the port 2b that is not reserved by the other UAV 1 is determined as the port 2 used for landing by the UAV 1a. If the reservation statuses of both the ports 2a and 2b by the other UAV 1 are released, the port 2a with a higher usage priority is determined on the basis of the usage priority of each of the ports 2a and 2b by the UAV 1a. Moreover, it is desirable that the port 2a used for landing by the UAV 1a is reserved before the UAV 1a flies. In this case, the port 2b used for landing by the UAV 1a is determined and reserved in the ports 2a and 2b before flight of the UAV 1a on the basis of the reservation status of each of the ports 2a and 2b by the other UAV 1 (for example, the UAVs 1b, 1c, etc.) different from the UAV 1a and the usage priority of each of the ports 2a and 2b by the UAV 1a. Then, while the UAV 1a is flying, if the reservation status of the port 2a with a usage priority higher than the usage priority of the port 2b reserved before flight of the UAV 1a changes (for example, if the reservation by the UAV 1b different from the UAV 1a is canceled or the reservation time by the UAV 1b is changed (for example, shortened, extended, or moved to a different time zone)), the port 2a whose reservation status has been changed may be determined and reserved as the port 2 used for landing by the UAV 1a. Namely, the port 2a, which is different from the port 2b, is reserved (changed in reservation) as the port 2 used for landing by the UAV 1a instead of the port 2b reserved before flight of the UAV 1a on the basis of the reservation status of ports 2a and 2b by other the UAV 1 different from the UAV 1a and the usage priority of ports 2a and 2b by the UAV 1a. Then, when the UAV 1a reaches the area Ar, the control is performed such that the UAV 1a flies toward newly reserved port 2a. Incidentally, the reservation process is performed by the management server MS, for example.

Herein, for example, the description will be given in consideration of a case where a flight plan change of the UAV 1b different from the UAV 1a occurs and the reservation of the port 2a reserved by the UAV 1b is canceled. In this case, after canceling the reservation of the port 2a by the UAV 1b, the port 2a is not used for landing at the reservation date and time unless a reservation is made by the other UAV 1 by the reservation date and time. However, while the UAV 1a tries to use the port 2a at the reservation date and time, if the port 2a is reserved by the UAV 1b at the time of reservation by the UAV 1a, the UAV 1a is not possible to reserve the port 2a. Then, the UAV 1a reserves the port 2b, which is more inconvenient than the port 2a for the UAV 1a instead of the port 2a, and then uses the port 2b for landing without knowing that the reservation for the port 2a by the UAV 1b has been canceled. In such a case, the port 2a is not used for landing, and the UAV 1a uses the inconvenient port 2b for landing. However, according to the method executed by the system S, the port is used efficiently, and the UAV 1 can use more suitable port 2 for landing.

[1-1. Outline of Configuration and Function of UAV 1]

Figure 3:
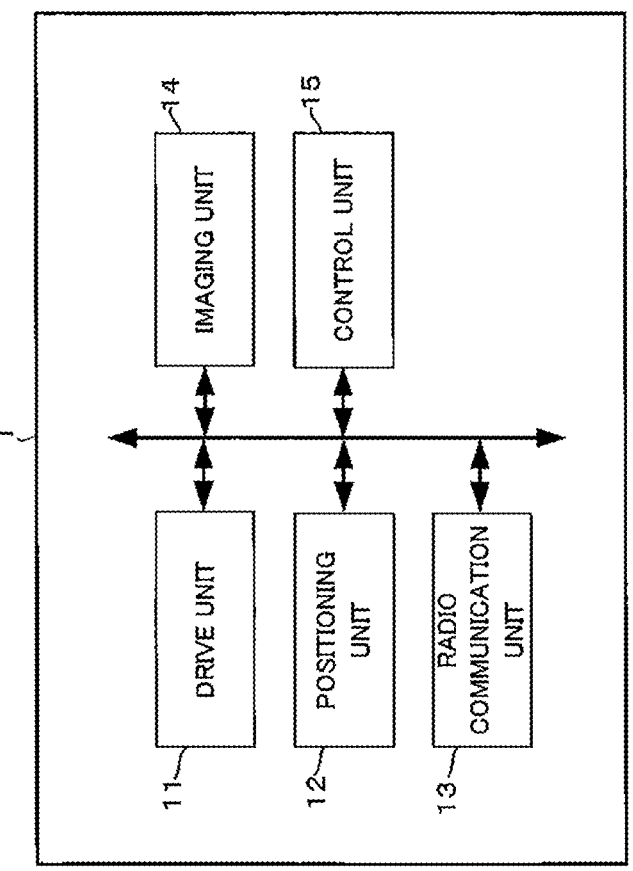
FIG. 3 is a diagram illustrating a schematic configuration example of an UAV 1.

Next, the outline of the configuration and function of the UAV 1 will be described with reference to FIG. 3. FIG. 3 is a diagram illustrating a schematic configuration example of the UAV 1. As illustrated in FIG. 3, the UAV 1 includes a drive unit 11, a positioning unit 12, a radio communication unit 13, an imaging unit 14, a control unit 15, and the like. Incidentally, while not illustrated, the UAV 1 includes a rotor (propeller) that is a horizontal rotary blade, various sensors, and a battery or the like that supplies power to each part of the UAV 1. Various sensors used for flight control of the UAV 1 include a barometric sensor, a three-axis acceleration sensor, a geomagnetic sensor, and the like. Detection information detected by the various sensors is output to the control unit 15. The detection information detected by the barometric sensor is used to calculate the flight speed of the UAV 1.

The drive unit 11 includes a motor, a rotating shaft, and the like. The drive unit 11 rotates a plurality of rotors by a motor, a rotating shaft, and the like that are driven according to a control signal output from the control unit 15. The positioning unit 12 includes a radio receiver, an altitude sensor, and the like. For example, the positioning unit 12 receives a radio wave transmitted from a GNSS (Global Navigation Satellite System) satellite by the radio receiver, and detects the current position (latitude and longitude) of the UAV 1 in the horizontal direction on the basis of the radio wave. Incidentally, the current position in the horizontal direction of the UAV 1 may be corrected on the basis of an image captured by the imaging unit 14 or a radio wave transmitted from the radio base station.

Further, the positioning unit 12 may detect the current position (altitude) in the vertical direction of the UAV 1 using the altitude sensor. The position information indicating the current position detected by the positioning unit 12 is output to the control unit 15. Incidentally, the position information of the UAV 1 can be applied in this embodiment even if the information is position information (that is, two-dimensional position information) indicating the current position (latitude and longitude) in the horizontal direction of the UAV 1. The radio communication unit 13 controls communication performed via the communication network NW. The imaging unit 14 includes a camera and the like. The imaging unit 14 continuously captures the real space within a range (around the UAV 1) that falls within the angle of view of the camera. Image information captured by the imaging unit 14 is output to the control unit 15.

The control unit 15 includes a central processing unit (CPU) which is a processor, a read only memory (ROM), a random access memory (RAM), a non-volatile memory, and the like. The control unit 15 executes various controls of the UAV 1 according to a control program (program code group) stored in, for example, a ROM or a non-volatile memory. Various types of control include take-off control, flight control, and landing control. In the flight control and the landing control, the position information acquired from the positioning unit 12, the image information acquired from the imaging unit 14, the detection information acquired from various sensors, flight plan information indicating a pre-registered flight plan, and instruction information from the UTMS 3 are used to control the speed of the rotor, the position, posture, and traveling direction of the UAV 1, and the like. According to this configuration, the UAV 1 can fly autonomously from the departure place to the destination. Herein, the autonomous flight of the UAV 1 is not limited to the autonomous flight in which the control unit 15 provided in the UAV 1 performs flight control. The autonomous flight of the UAV 1 includes, for example, an autonomous flight by performing autonomous control as the entire unmanned aerial vehicle system S. Incidentally, the control unit 15 can also perform flight control in accordance with an instruction signal from the control terminal. Then, during the flight of the UAV 1, the control unit 15 periodically transmits the aircraft information of the UAV1 together with the aircraft ID of the UAV1 to the UTMS 3 via a radio communication unit 23. The aircraft ID and the aircraft information of the UAV 1 may be transmitted from the UAV 1 to the UTMS 3 via the GCS.

[1-2. Outline of Configuration and Function of Control Server CS]

Figure 4:
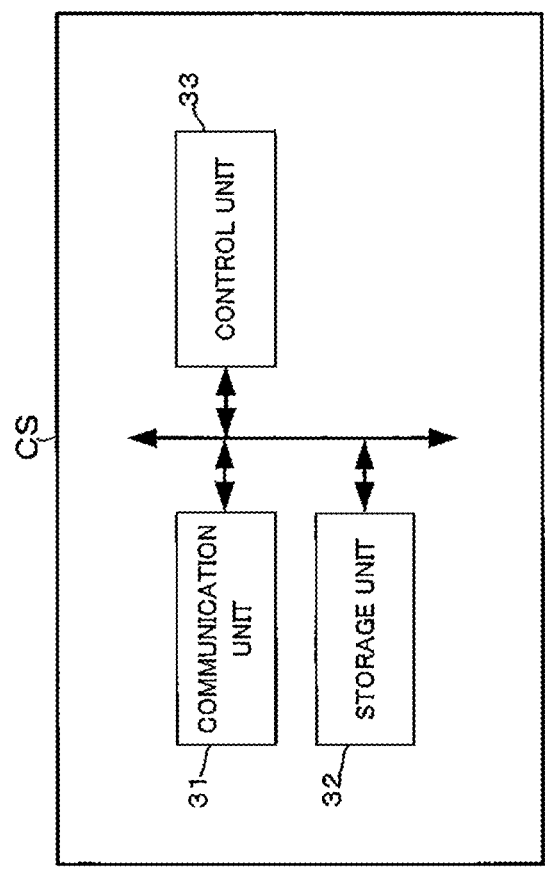
FIG. 4 is a diagram illustrating a schematic configuration example of a control server CS.
Figure 5:
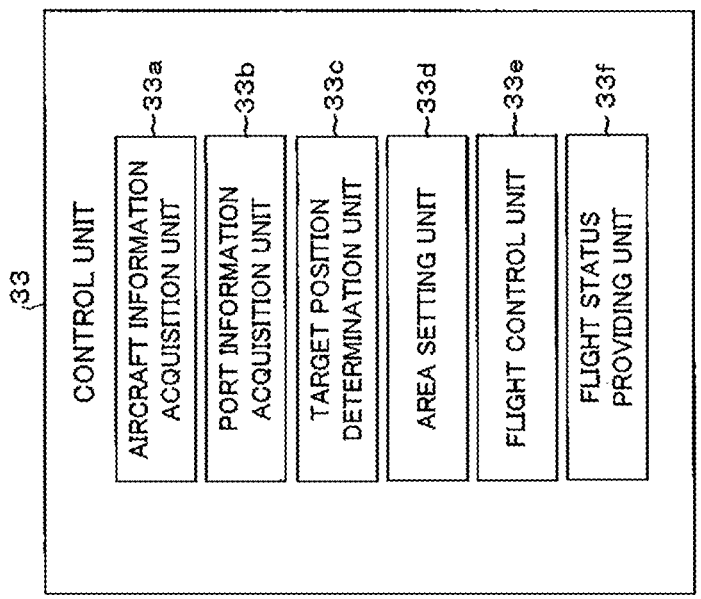
FIG. 5 is a diagram illustrating an example of functional blocks in a control unit 33.

Next, the outline of the configuration and function of the control server CS will be described with reference to FIGS. 4 and 5. FIG. 4 is a diagram illustrating a schematic configuration example of the control server CS. As illustrated in FIG. 4, the control server CS includes a communication unit 31, a storage unit 32, and a control unit 33, etc. The communication unit 31 serves to control communication performed via the communication network NW. The storage unit 32 includes, for example, a hard disk drive, and the like. The storage unit 32 stores the aircraft ID of the UAV 1, the flight plan information indicating the flight plan of the UAV 1, and the aircraft information of the UAV 1 in association with each other for each of the plurality of UAVs 1 (for example, the UAV 1 subjected to flight control).

The control unit 33 includes a CPU that is a processor, a ROM, a RAM, and a non-volatile memory, etc. FIG. 5 is a diagram illustrating an example of functional blocks in the control unit 33. For example, according to a program stored in the ROM or the non-volatile memory, the control unit 33 functions, as illustrated in FIG. 5, as an aircraft information acquisition unit 33*a*, a port information acquisition unit 33*b*, a target position determination unit 33*c*, an area setting unit 33*d*, a flight control unit 33*e*, and a flight status providing unit 33*f*. The port information acquisition unit 33*b* is an example of an acquisition unit of the control device. The target position determination unit 33*c* is an example of a first determination unit of the control device. The flight control unit 33*e* is an example of a first control unit and a second control unit of the control device.

The aircraft information acquisition unit 33*a* periodically acquires the aircraft information of the UAV 1*a* from the UAV 1*a* or the GCS via the communication unit 31 together with the aircraft ID of the UAV 1 to be flight-controlled (hereinafter, the UAV 1*a* is taken as an example). The port information acquisition unit 33*b* acquires the aircraft ID of the UAV 1*a* to be flight-controlled, the port IDs of the plurality of ports 2 selected as landing candidates of the UAV 1*a*, the usage priority of each of the plurality of ports 2 by the UAV 1*a*, and the port information of each of the plurality of port 2 from the management server MS (port information providing unit 43*c*) via the communication unit 31. Herein, the port 2 selected as a landing candidate of the UAV 1*a* to be flight-controlled corresponds to the port 2 reserved by the UAV 1*a* and the port 2 not reserved by the UAV 1*a*. Incidentally, the port information acquired by the port information acquisition unit 33*b* includes, for example, the position information of the port 2 and reservation information of the port 2.

Figure 6:
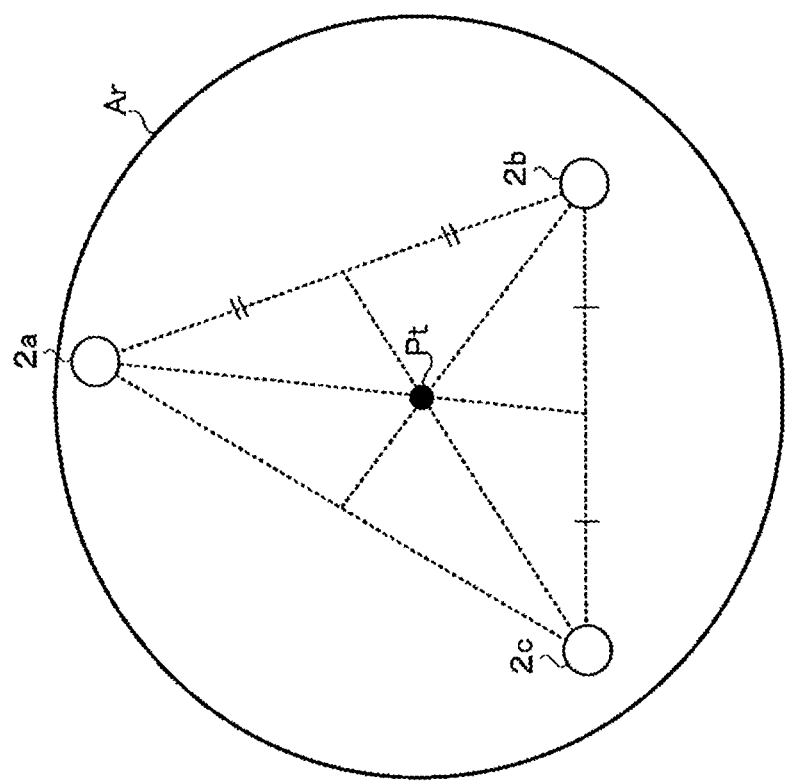
FIG. 6 is a diagram illustrating an example in which a gravity center of a triangle formed on the basis of respective positions of three ports 2a to 2c is set as a target position Pt.
Figure 7:
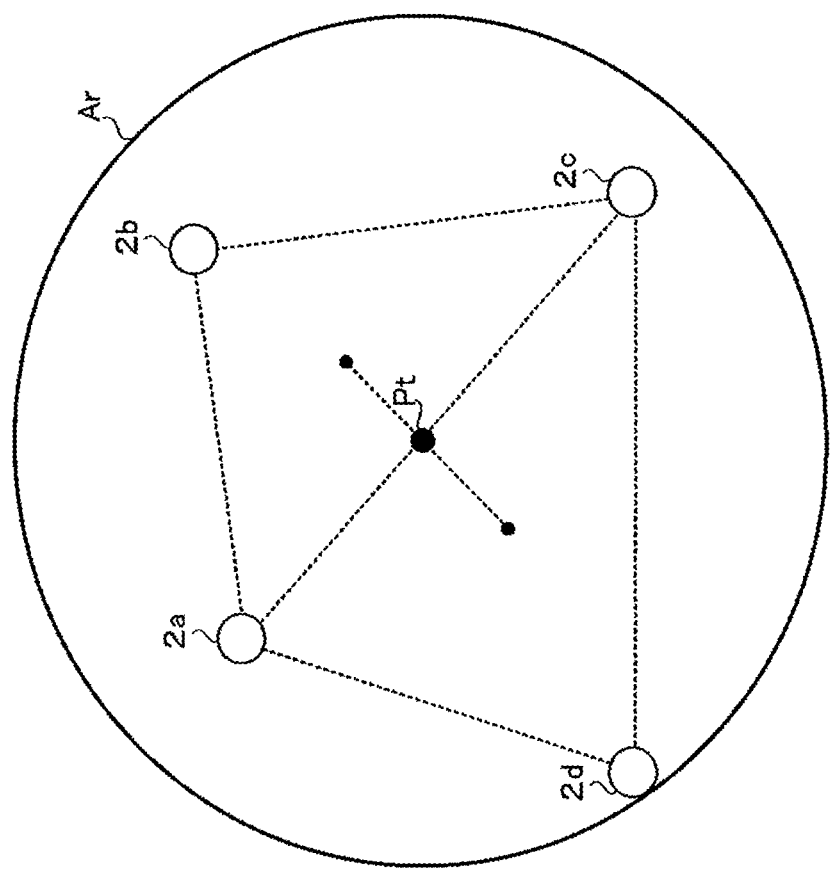
FIG. 7 is a diagram illustrating an example in which a gravity center of a quadrangle formed on the basis of respective positions of four ports 2a to 2d is set as a target position Pt.

The target position determination unit 33*c* determines the target position Pt to which the UAV 1*a* is headed on the basis of the positions of each of the plurality of ports 2 selected as landing candidates of the UAV 1*a* to be flight-controlled. For example, when the respective positions of the two ports 2 are based, as illustrated in FIG. 2, the target position determination unit 33*c* determines the midpoint between the respective positions of the two ports 2*a* and 2*b* as the target position Pt. Alternatively, when the respective positions of three or more ports 2 are based, the target position determination unit 33*c* determines a gravity center (geometric center) of an n (n is an integer of 3 or more) polygon (polygonal shape) formed on the basis of the respective positions of the three or more ports 2 as the target position Pt. FIG. 6 illustrates an example in which the gravity center of a triangle formed on the basis of respective positions of the three ports 2*a* to 2*c* is set as the target position Pt. FIG. 7 illustrates an example in which the gravity center of a quadrangle formed on the basis of respective positions of the four ports 2*a* to 2*d* is set as the target position Pt. As described above, since the target position Pt to which the UAV 1*a* is headed is determined on the basis of the positions of the plurality of ports 2 selected as landing candidates, even in a case where the port 2 of the plurality of ports 2 is landed by the UAV 1*a*, it is possible to determine an appropriate target position Pt in which the flight efficiency of the UAV 1*a* does not decrease as much as possible.

Figure 8:
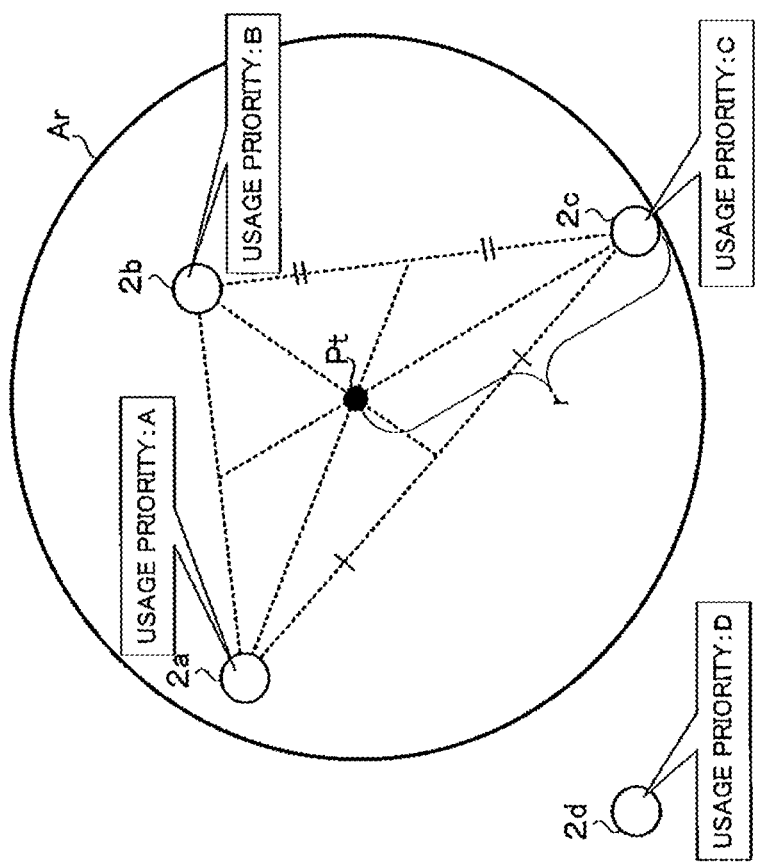
FIG. 8 is a diagram illustrating an example in a case where a gravity center of a triangle formed on the basis of a position of a reserved port 2c and a position of each of ports 2a and 2b that have a usage priority higher than an usage priority of a port 2c is set as a target position Pt.

Moreover, in a case where the port 2 reserved for the UAV 1*a* to be flight-controlled is included in the port 2 used for determining the target position Pt, the target position determination unit 33*c* may determine the target position Pt to which the UAV 1*a* is headed on the basis of the position of the reserved port 2 and the position of the port 2 (that is, the port 2 not reserved by the UAV 1*a*) for which a usage priority higher than the usage priority of the port 2 is set. FIG. 8 illustrates an example in a case where the gravity center of the triangle formed on the basis of the position of the reserved port 2*c* and the position of each of the ports 2*a* and 2*b* (that is, the non-reserved ports 2*a* and 2*b*) that have a usage priority higher than the usage priority of the port 2*c* is set as the target position Pt. In other words, in the example of FIG. 8, the target position Pt is determined by excluding the port 2*d* in which a usage priority lower than the usage priority of the reserved port 2*c* is set. In this example, the port 2*d* with a usage priority lower than the usage priority of reserved port 2*c* is not used for landing by the UAV 1*a* (that is, reservation is not changed to the port 2*d*). Therefore, it is possible to determine an appropriate target position Pt that does not lower the flight efficiency by excluding such port 2*d*. Incidentally, in a case where the reservation of the port 2 by the UAV 1*a* is changed while the flight-controlled UAV 1*a* is in flight, the target position determination unit 33*c* determines a target position Pt" to which the UAV 1*a* is headed on the basis of the position of the port 2 whose reservation has been changed and the position of the port 2 (that is, the port 2 not reserved by the UAV 1*a*) for which a usage priority higher than the usage priority of the reservation-changed port 2 is set.

The area setting unit 33*d* sets the area Ar with the target position Pt as a reference (for example, the center). The area Ar includes the position of each of the plurality of ports 2 which are used for determining the target position Pt as illustrated in FIGS. 2, 6, and 7. Herein, the area Ar including the position of the port 2 may be the area Ar in which any one point within the range occupied by the ports 2 (for example, a center point if the port 2 is circular, a point on the boundary of the circle, etc.), or may be the area Ar which includes the entire range occupied by the ports 2. In a case where a polygon is formed by the positions of the plurality of ports 2 as illustrated in FIGS. 6 and 7, the area setting unit 33*d* may determine the area Ar on the basis of the distance between the position of the port 2 farthest away from the target position Pt among the ports 2 (for example, the position of any one point within the range occupied by the ports 2) and the target position Pt. According to this configuration, even in a case where any port 2 among the plurality of ports 2 is used for landing by the UAV 1*a*, it is possible to set an appropriate area Ar in which the flight efficiency of the UAV 1*a* does not decrease as much as possible. For example, a circle having a radius between the position of the port 2 farthest away from the target position Pt and the target position Pt with the target position Pt as the center may be set as the area Ar.

Moreover, in a case where the port 2 reserved by the UAV 1*a* is included in the plurality of ports 2 used for determining the target position Pt, the area setting unit 33*d* may set the area Ar with the target position Pt as a reference (for example, the center), which includes the position of the reserved port 2 and the position of the port 2 (that is, the port 2 not reserved by the UAV 1*a*) for which a usage priority higher than the usage priority of the reserved port 2 is set. As described above, the port 2 with a usage priority lower than the reserved usage priority of the port 2 is not used for landing by the UAV 1*a*. Therefore, it is possible to set an appropriate area Ar that does not lower the flight efficiency by excluding such port 2. In particular, as illustrated in FIG. 8, in a case where a polygon is formed by the plurality of ports 2, the area setting unit 33*d* may set the area Ar on the basis of the reserved port 2 and the distance between the position of the port 2 farthest away from the target position Pt among the ports 2 (that is, the port 2 not reserved by the UAV 1*a*) for which a usage priority higher than the usage priority of the reserved port 2 is set and the target position Pt. For example, as illustrated in FIG. 8, the area Ar is set within a circle centered on the target position Pt and having a radius r between the position of the port 2*c* farthest away from the target position Pt and the target position Pt. Incidentally, in a case where the reservation of the port 2 by the UAV 1*a* is changed while flight-controlled UAV 1*a* is in flight, the area setting unit 33*d* may reset the area Ar with the target position Pt as a reference (for example, the center), which is the area Ar" which includes the position of the reservation-changed port 2 and the position of the port 2 (that is, the port 2 not reserved by the UAV 1*a*) for which a usage priority higher than the usage priority of the reservation-changed port 2.

As described with reference to FIGS. 2, and 6 to 8, the determination of the target position Pt and the setting of the area Ar may be performed on a two-dimensional plane. For example, in a case where the position of the port 2 is represented by latitude and longitude, the latitude and longitude of each port 2 is converted into position coordinates in a predetermined two-dimensional plane, and the target position Pt may be determined and the area Ar may be set in the two-dimensional plane. It is also possible to convert the target position Pt and the area Ar into latitude and longitude. Incidentally, it is also possible to determine the target position Pt and set the area Ar according to the axiom of non-Euclidean geometry. For example, the surface of the earth is regarded as a spherical model, and the midpoint between the plurality of ports 2 on the surface of the earth, or the gravity center of an n-polygon formed on the basis of the position of the plurality of ports 2 is obtained according to the axiom of spherical geometry, and may be set as the target position Pt. Moreover, the area Ar with the target position Pt as a reference may be set on the surface of the earth according to the axiom of spherical geometry.

The flight control unit 33*e* recognizes the flight position of the UAV 1*a* to be flight-controlled, the target position Pt, and the boundary position of the area Ar. Incidentally, the boundary position is represented by latitude and longitude, for example. Then, the flight control unit 33*e* transmits instruction information indicating the target position Pt to the UAV 1*a* before the UAV 1*a* enters the area Ar, thereby controlling the UAV 1*a* to fly toward the target position Pt. During this time, in a case where the port 2 used for landing by the UAV 1*a* is determined and reserved (new reservation or reservation change), the reservation information of each of the plurality of ports 2 selected as landing candidates of the UAV 1*a* together with the aircraft ID of the UAV 1*a* (that is, including the changed reservation information) is acquired by the port information acquisition unit 33*b*. Then, if the flight control unit 33*e* determines that the UAV 1*a* reaches the area Ar on the basis of the flight position (current position) of the UAV 1*a* and the boundary position of the area Ar, the instruction information indicating the position of the port 2 reserved by the UAV 1*a* is transmitted to the UAV 1*a* to control the UAV 1*a* to fly toward the reserved port 2. By this configuration, the UAV 1*a* flying toward the target position Pt changes in course at the boundary position of the area Ar and flies toward the position of the reserved port 2.

In this way, the determination on the course change is made on the basis of the flight position of the UAV 1*a* and the boundary position of the area Ar. However, instead, it may be made on the basis of the estimated arrival time at which the UAV 1*a* arrives at target position Pt. In this case, for example, the flight control unit 33*e* calculates a required estimation time from the distance between the flight position of the UAV 1*a* and the target position Pt and the flight speed of the UAV 1*a*, and calculates an estimated arrival time from the calculated required estimation time and the current time. Then, once the flight control unit 33*e* determines that it is a predetermined time before the calculated estimated arrival time (for example, 5 minutes before), the instruction information indicating the position of the reserved port 2 by the UAV 1*a* is transmitted to the UAV 1*a* such that the UAV1*a* flies toward the reserved port 2.

The flight status providing unit 33*f* transmits flight status information of the UAV 1*a* to the management server MS via the communication unit 31 together with the aircraft ID of the UAV 1*a* to be flight-controlled. The flight status information is information indicating the flight status of the UAV 1*a* to be flight-controlled. For example, in a case where the flight control of the UAV 1*a* is started, the flight status providing unit 33*f* transmits the flight status information indicating that the flight control of the UAV 1*a* is started to the management server MS via the communication unit 31 together with the aircraft ID of the UAV 1*a*. Moreover, in a case where the UAV 1*a* reaches the area Ar, the flight status providing unit 33*f* transmits the flight status information indicating that the UAV 1*a* has reached the area Ar to the management server MS via the communication unit 31 together with the aircraft ID of the UAV 1*a*. Incidentally, in a case where a predetermined time (for example, several minutes with a margin) before the UAV 1*a* reaches the area Ar, the flight status providing unit 33*f* may transmit the flight status information indicating that it is the predetermined time before he UAV 1*a* reaches the area Ar to the management server MS via the communication unit 31 together with the aircraft ID of the UAV 1*a*.

[1-3. Outline of Configuration and Function of Management Server MS]

Figure 9:
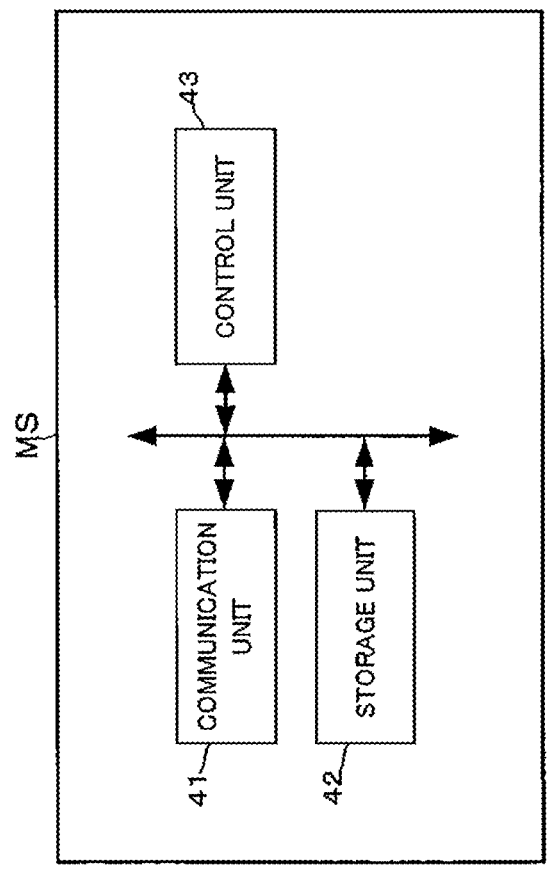
FIG. 9 is a diagram illustrating a schematic configuration example of a management server MS.
Figure 10:
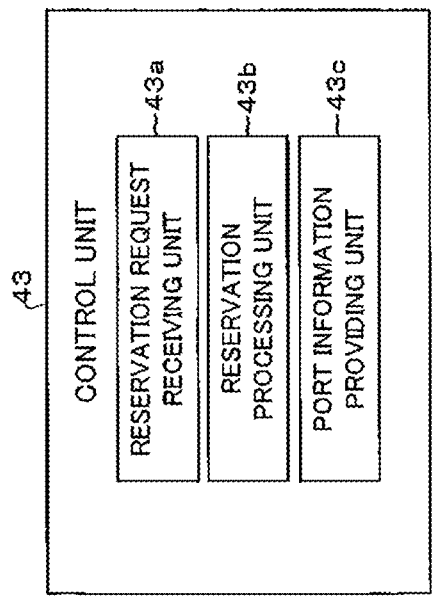
FIG. 10 is a diagram illustrating an example of functional blocks in a control unit 43.

Next, the outline of the configuration and function of the management server MS will be described with reference to FIGS. 9 and 10. FIG. 9 is a diagram illustrating a schematic configuration example of the management server MS. As illustrated in FIG. 9, the management server MS includes a communication unit 41, a storage unit 42, a control unit 43, and the like. The communication unit 41 controls communication performed through the communication network NW. The storage unit 42 includes, for example, a hard disk drive, and the like. The storage unit 42 stores the port ID of the port 2, the name of the port 2, the position information of the port 2, and the reservation information of the port 2 in association with each other for each of the plurality of ports 2. Incidentally, the name of the port 2 may include, for example, a facility name such as a station name, a park name, or a store name. The reservation information of the port 2 includes the aircraft ID of the UAV 1 that has reserved the port 2, the reservation date and time, and the like. Moreover, the storage unit 42 stores the aircraft ID of the UAV 1, the port IDs of the plurality of ports 2 selected as landing candidates of the UAV 1, and the usage priority of each of the plurality of ports 2 by the UAV 1 in association with each other for each of the plurality of UAVs 1.

The control unit 43 includes a CPU which is a processor, a ROM, a RAM, a non-volatile memory, and the like. FIG. 10 is a diagram illustrating an example of functional blocks in the control unit 43. As illustrated in FIG. 10, the control unit 43 functions as a reservation request receiving unit 43*a*, a reservation processing unit 43*b*, and the port information providing unit 43*c*, for example, according to a program stored in a ROM or a non-volatile memory. Incidentally, the reservation processing unit 43*b* is an example of an acquisition unit, a first reservation unit, and a second reservation unit of the management device.

The reservation request receiving unit 43*a* receives a reservation request of the port 2 from, for example, a predetermined server on the communication network NW. This reservation request includes the aircraft ID of the UAV 1 related to the reservation request (hereinafter, the UAV 1*a* is taken as an example), the port IDs of the plurality of ports 2 selected as landing candidates of the UAV 1*a*, the usage priority of each of the plurality of ports 2 by the UAV 1*a*, and the reservation date and time. The plurality of ports 2 that are landing candidates of the UAV 1*a* are selected according to an instruction from the operator of the UAV 1*a*, for example. Alternatively, the plurality of ports 2 that are landing candidates of the UAV 1*a* may be automatically selected (without an instruction input by the operator) on the basis of the flight plan of the UAV 1*a*. In this case, the plurality of ports 2 existing in a target area included in the flight plan of the UAV 1*a* are selected as the plurality of ports 2 that are landing candidates of the UAV 1*a*. Moreover, in a case where the UAV 1*a* is used for cargo delivery, the plurality of ports 2 that are landing candidates of the UAV 1*a* may be selected, for example, in accordance with an instruction from a cargo delivery requester or a cargo recipient of the cargo delivered to the port 2 by the UAV 1*a*.

The usage priority of each of the plurality of ports 2 by the UAV 1*a* is set according to an instruction from the operator of the UAV 1*a*, for example. According to this configuration, it is possible to set the usage priority according to intention of the operator of the UAV 1*a*, and it is possible to improve the convenience for the operator to use the port 2. Alternatively, the usage priority of each of the plurality of ports 2 may be automatically set on the basis of the flight plan of the UAV 1*a*. According to this configuration, it is possible to set the usage priority according to the flight plan of the UAV 1*a*, and it is possible to improve the convenience for the UAV 1*a* operator to use the port 2. For example, the usage priority may be set so as to increase in an order from the departure place among the plurality of ports 2 selected in the target area. Alternatively, the usage priority may be set so as to increase in an order of the short required estimation time from the departure place among the plurality of ports 2 selected in the target area. Moreover, in a case where the UAV 1*a* is used for cargo delivery, the usage priority of each of the plurality of ports 2 may be set in accordance to an instruction from a delivery requester or a recipient of the cargo delivered to the port 2 by the UAV 1*a*. According to this configuration, it is possible to set the usage priority according to intention of the cargo delivery requester or the cargo recipient, and the convenience of using the port 2 by the cargo delivery requester or the cargo recipient can be improved.

In accordance with the reservation request received by the reservation request receiving unit 43*a*, the reservation processing unit 43*b* performs a reservation process for determining and reserving the port 2 that the UAV 1*a* is used for landing at the reservation date and time included in the reservation request. In this reservation process, on the basis of the reservation status of each of the plurality of ports 2 (that is, the plurality of ports 2 selected as landing candidates of the UAV 1*a* related to the reservation request) by the other UAV 1 different from the UAV 1a related to the reservation request, the reservation processing unit 43b determines the port 2 that is not reserved by the other UAV 1 within a predetermined time before and after the reservation date and time included in the reservation request as the port 2 used for landing by the UAV 1a related to the reservation request. Herein, in a case where there is one port 2 that is not reserved by the other UAV 1, the reservation processing unit 43b determines the one port 2 that is not reserved as the port 2 that the UAV 1a is used for landing. On the other hand, in a case where there are a plurality of ports 2 that are not reserved by the other UAV 1, the reservation processing unit 43b acquires the usage priority of each of the plurality of ports 2 by the UAV 1a from the reservation request, for example. Then, the reservation processing unit 43b determines the port 2 used by the UAV 1a for landing on the basis of the usage priority of each of the plurality of ports 2 by the UAV 1a in addition to the reservation status of each of the plurality of ports 2 by the other UAV 1. For example, among the plurality of ports 2a and 2b not reserved by the other UAV 1, the port 2a with the highest usage priority by the UAV 1a related to the reservation request is determined as the port 2 used for landing by the UAV 1a. When the port 2 is determined in this way, the reservation processing unit 43b stores the reservation information including the aircraft ID of the UAV 1a that has reserved the port 2 and the reservation date and time in association with the port ID of the determined port 2 so as to reserve (newly reserve) port 2 that the UAV 1a is used for landing.

Moreover, the reservation processing unit 43b performs a port cancellation check while the UAV 1a is flying after the reservation of the port 2 used for landing by the UAV 1a. The port cancellation check is a method for detecting a change in the reservation status of the port 2 by the other UAV 1. In the port cancellation check, it is checked whether the reservation of the port 2 with a usage priority higher than the usage priority of the port 2 reserved by flight-controlled UAV 1a (that is, the reservation by other UAV 1) has been canceled. In this port cancellation check, the reservation time of the port 2 with a usage priority higher than the usage priority of the port 2 reserved by flight-controlled UAV 1a (that is, the reservation time by other UAV 1) is changed (for example, whether it has been shortened, extended, or moved to a different time zone) may be checked. Then, in a case where the reservation of the port 2 with a usage priority higher than the usage priority of the port 2 reserved by the UAV 1a is canceled (or, in a case where the reservation time by the other UAV 1 is not included in a predetermined time before and after the reservation date and time requested by the UAV 1a by changing the reservation time), the port 2 for which the reservation by other UAV 1 is canceled (or, the reservation time has been changed) is determined and reserved as the port 2 used for landing by the UAV 1a (reservation change) instead of the port 2 already reserved by the UAV 1a (that is, the port 2 is canceled). According to this configuration, it is possible to dynamically change the reservation of the port 2 to which a higher usage priority is set while the UAV 1a is flying.

Namely, while the UAV 1a to be flight-controlled is flying, the reservation processing unit 43b determines and reserves a port 2 different from the port 2 already reserved by the UAV 1a as a port 2 to be used for landing by the UAV 1a on the basis of the reservation status of each of the plurality of ports 2 by the other UAV 1 different from the UAV 1a and the usage priority of each of the plurality of ports 2 by the UAV 1a. By this configuration, the reservation information associated with the port ID of the determined port 2 is changed (change of the aircraft ID and, in some cases, the reservation date and time). Herein, the reservation information associated with the port ID of the port 2 already reserved by the UAV 1a is changed without reservation. Incidentally, the port cancellation check may be performed before the UAV 1a to be flight-controlled enters the area Ar. According to this configuration, it is possible to reserve the port 2 used for landing by the UAV 1a with a time margin during the flight of the UAV 1a. Preferably, the port cancellation check may be performed plural times at a predetermined time interval before the UAV 1a to be flight-controlled enters the area Ar from the start of flight. Moreover, the port cancellation check may be performed when the UAV 1a to be flight-controlled reaches the area Ar. According to this configuration, it is possible to reserve the port 2 used for landing by the UAV 1a at a flight position as close as possible to the target position Pt to which the UAV 1a is headed. Thus, it is possible to increase a possibility that a more suitable port 2 is reserved.

The port information providing unit 43c transmits the aircraft ID of the UAV 1a related to the reservation request received by the reservation request receiving unit 43a, the port IDs of the plurality of ports 2 selected as landing candidates of the UAV 1a, the usage priority of each of the plurality of ports 2 by the UAV 1a, and the port information of each of the plurality of ports 2 to the control server CS via the communication unit 41. This transmission is performed, for example, when the port 2 used for landing by the UAV 1a related to the reservation request is reserved (new reservation or reservation change).

[2. Example of Operation of Unmanned Aerial Vehicle System S]

Figure 11:
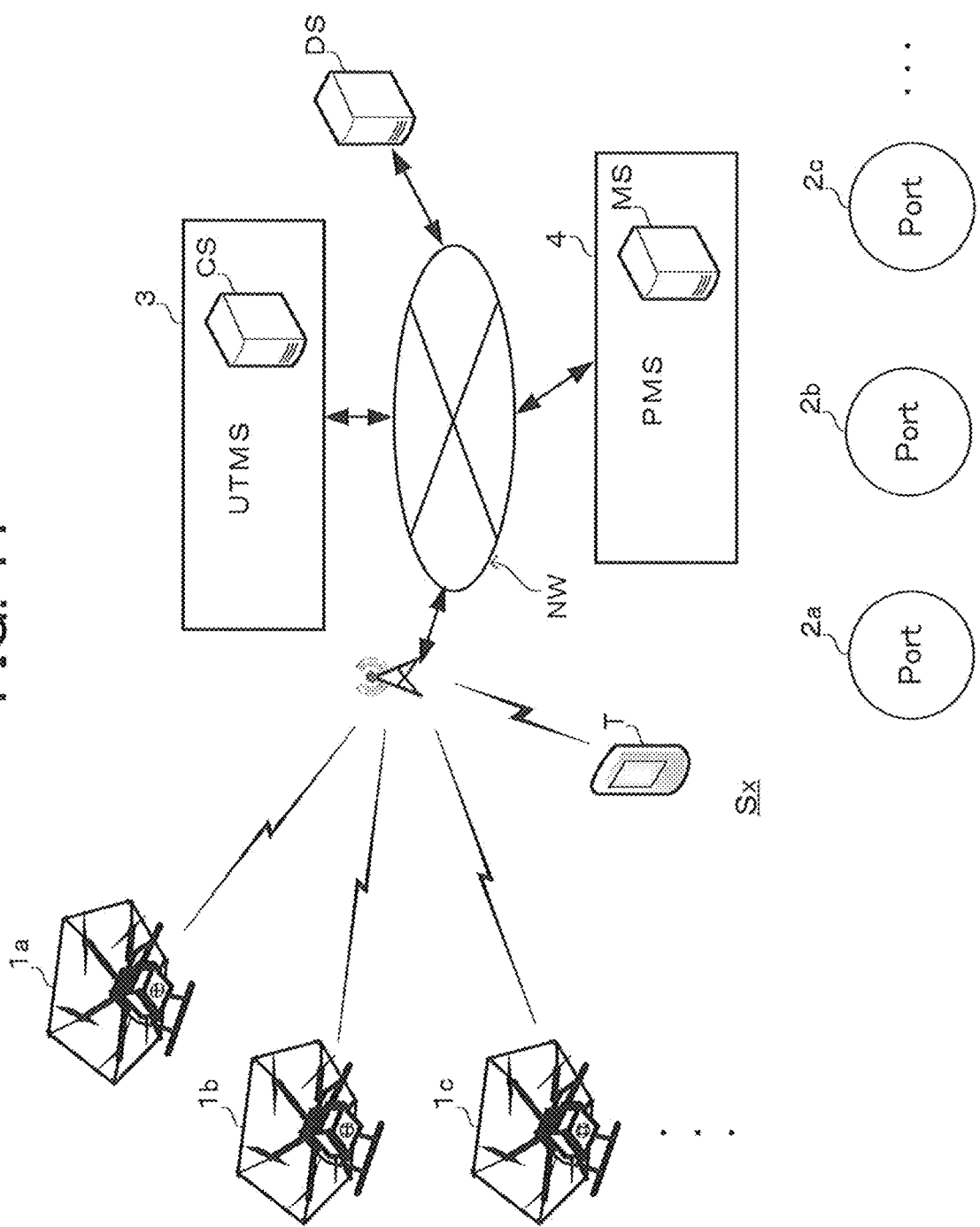
FIG. 11 is a diagram illustrating a schematic configuration example of a cargo delivery system Sx.
Figure 12:
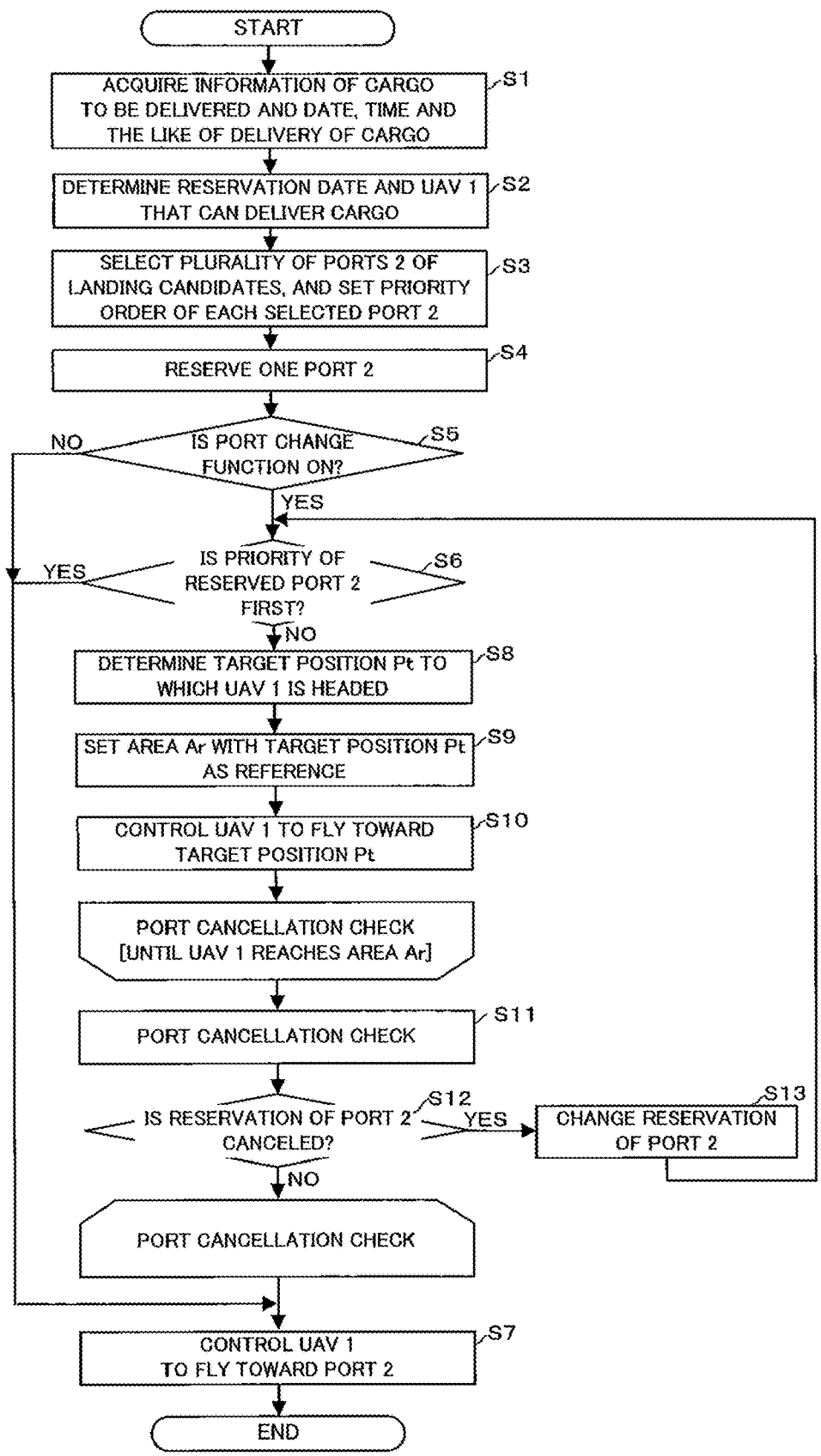
FIG. 12 is a flowchart illustrating a flow of processing executed by a cargo delivery system Sx.

Next, an example of the operation of the unmanned aerial vehicle system S according to this embodiment will be described with reference to FIGS. 11 and 12, etc. Incidentally, the example described below is an example in a case where the unmanned aerial vehicle system S is applied to a cargo delivery system Sx. FIG. 11 is a diagram illustrating a schematic configuration example of the cargo delivery system Sx. The cargo delivery system Sx illustrated in FIG. 11 is configured to include a delivery processing server DS and the like that performs processing related to cargo delivery in addition to the UAV 1, the port 2, the UTMS 3, and the PMS 4. The delivery processing server DS can communicate with the UTMS 3, the PMS 4, the GCS, and the like via the communication network NW. Moreover, the delivery processing server DS can be accessed from a mobile terminal T (for example, a smartphone, a tablet, etc.) used by a cargo delivery requester. The delivery processing server DS manages information such as the ID, name, telephone number, email address, and the like of the cargo delivery requester. Incidentally, the cargo delivery requester may be a cargo recipient or a person other than the recipient. FIG. 12 is a flowchart illustrating a flow of processing executed by the cargo delivery system Sx illustrated in FIG. 11.

The process illustrated in FIG. 12 is started, for example, when the delivery processing server DS receives a delivery request from the mobile terminal T. When the process illustrated in FIG. 12 is started, the delivery processing server DS acquires information such as the cargo to be delivered and the delivery date and time of the cargo in response to the delivery request from the mobile terminal T (Step S1). Incidentally, the delivery date and time of the cargo may be specified by the cargo delivery requester, or may be determined according to the criteria of the delivery processing server DS. Next, the delivery processing server DS determines the reservation date and time on the basis of the acquired delivery date and time and determines, for example, the UAV 1a that can deliver the cargo on the determined reservation date and time (Step S2). Incidentally, the deliverable UAV 1a is determined on the basis of information from, for example, the GCS. Next, the delivery processing server DS selects, for example, the ports 2a to 2d that are the landing candidates of the determined UAV 1a, and sets the priority order (an example of usage priority) of each of the selected ports 2a to 2d (Step S3). Herein, a specific example of a method for selecting the ports 2a to 2d as landing candidates of the UAV 1a and a method for setting the priority order will be described with reference to FIGS. 13 and 14.

First, the delivery processing server DS transmits a receiving area designating page for accepting designation of a cargo receiving area to the mobile terminal T. By this configuration, the receiving area designating page is displayed on the display D of the mobile terminal T. Then, when the delivery requester specifies a desired receiving area through the receiving area designating page, the delivery processing server DS transmits a port selection page for accepting the selection of the port 2 in the receiving area specified by the delivery requester to the mobile terminal T. By this configuration, the port selection page is displayed on the display D of the mobile terminal T. Incidentally, the delivery processing server DS acquires the port IDs, names, and position information of the plurality of ports 2 existing in the receiving area from, for example, the management server MS.

Figure 13:
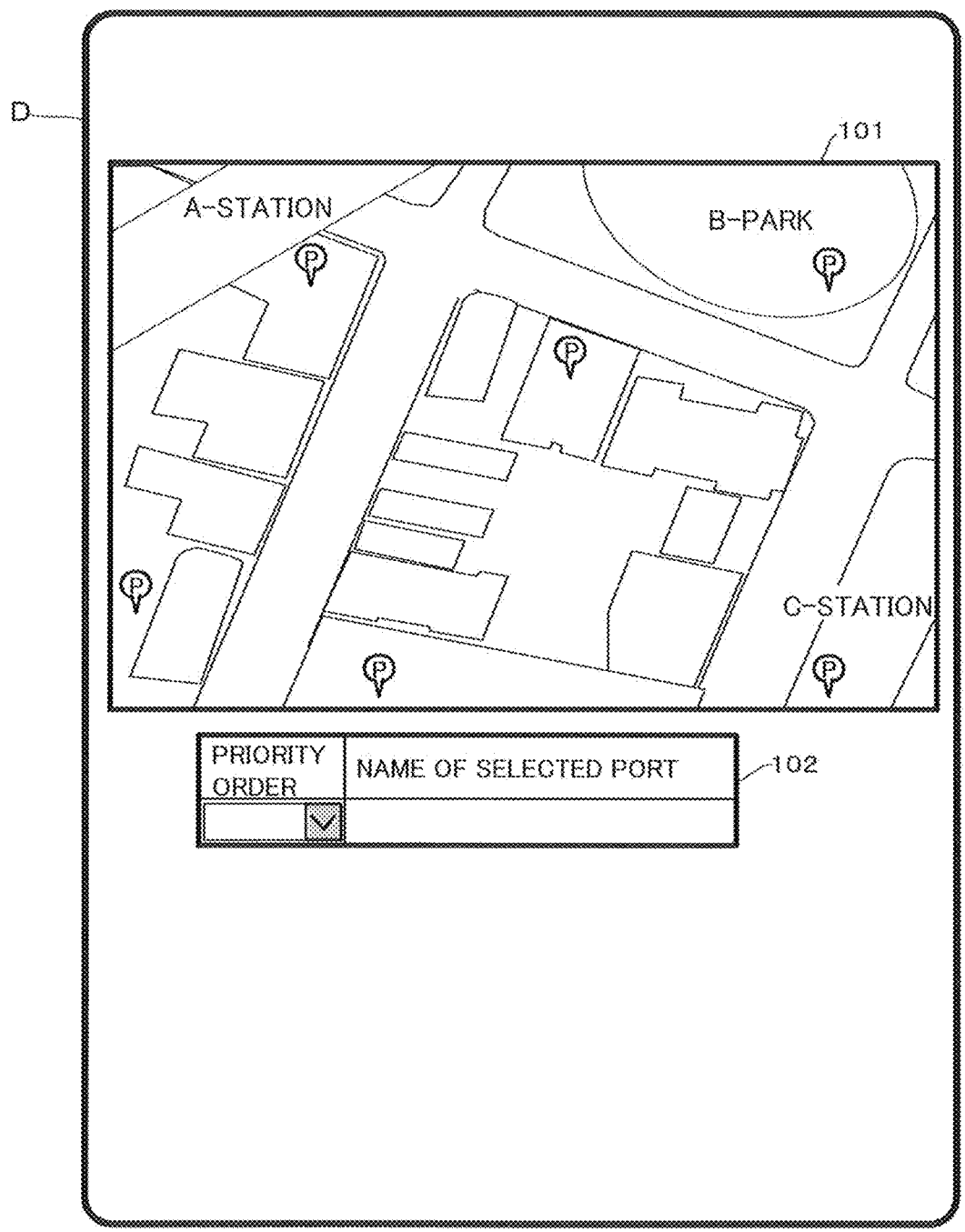
FIG. 13 is a diagram illustrating a display example of a port selection page when a port selection page is received.

FIG. 13 is a diagram illustrating a display example of the port selection page when the port selection page is received. As illustrated in FIG. 13, a map 101 in the reception area designated by the delivery requester is displayed on the port selection page. On the map 101, a port mark P corresponding to each of the plurality of ports 2 existing in the receiving area is displayed at a position on the basis of the position information of the respective ports 2. Incidentally, instead of the map 101, a list of the plurality of ports 2 existing in the receiving area (for example, a name list) may be displayed. Moreover, a selected port display field 102 is displayed on the port selection page illustrated in FIG. 13. In the selected port display field 102, the name of each of the plurality of ports 2 selected as a cargo receiving place and the priority order of each of the plurality of ports 2 can be displayed according to the instruction from the delivery requester.

Figure 14:
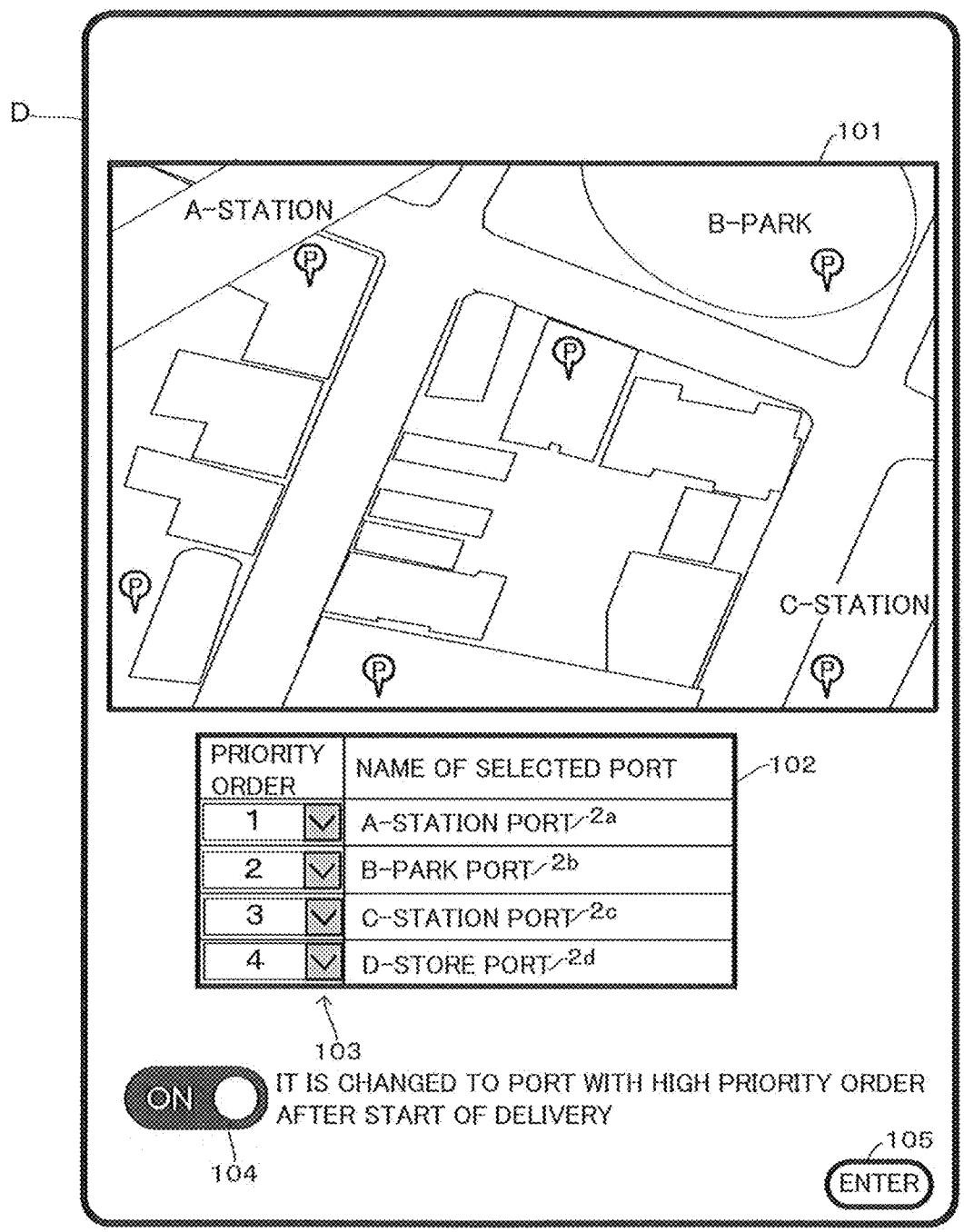
FIG. 14 is a diagram illustrating a display example of a port selection page when a plurality of ports 2 is selected as a cargo receiving place.

FIG. 14 is a diagram illustrating a display example of the port selection page when the plurality of ports 2 is selected as a cargo receiving place. For example, among the plurality of port marks P displayed on the map 101 illustrated in FIG. 13, when the delivery requester sequentially specifies the port marks P corresponding to the plurality of desired receiving places, the ports 2a to 2d each corresponding to the designated port marks P are selected by the delivery processing server DS, and the priority order of each of the ports 2a to 2d is set by the delivery processing server DS in the designated order. By this configuration, the names and priority order of the ports 2a to 2d are displayed in the selected port display field 102 as illustrated in FIG. 14. The plurality of ports 2a to 2d selected herein are the plurality of ports 2 selected as landing candidates of the UAV 1a determined in Step S2. In the example of FIG. 14, the name of the port 2a is an A-station port with a first priority order, the name of the port 2b is a B-park port with a second priority order, the name of the port 2c is a C-station port with a third priority order, and the name of the port 2d is a D-store port with a fourth priority order. Incidentally, the delivery requester can change the priority order set for the selected ports 2a to 2d through designation of a pull-down list button 103. Moreover, an ON/OFF switching button 104 for the port change function is displayed on the port selection page illustrated in FIG. 14. The port change function is a function to change the reserved port 2 with a low priority order to the port 2 with a high priority order after the start of cargo delivery (that is, while the UAV 1a delivering the cargo is flying). In the example of FIG. 14, since the ON/OFF switching button 104 indicates ON, the port change function is set to ON.

Then, when the delivery requester designates a confirmation button 105 in the display state as illustrated in FIG. 14, for example, the delivery processing server DS transmits a reservation request for the port 2 to the management server MS. This reservation request includes the aircraft ID of the UAV 1a determined in Step S2, the port IDs of the plurality of ports 2a to 2d selected in Step S3, the priority order set to the plurality of ports 2a to 2d in Step S3, and the reservation date and time determined in Step S2. At this time, ON/OFF setting information of the port change function is transmitted from the delivery processing server DS to the management server MS. Incidentally, information included in the reservation request and the ON/OFF setting information may be transmitted from the delivery processing server DS to the control server CS.

Next, when the management server MS receives the reservation request from the delivery processing server DS, the management server MS performs a reservation process of determining and reserving the port 2 to be used for landing for the UAV 1a (that is, the UAV 1a determined in Step S2) related to the reservation request (Step S4). In this reservation process, as described above, the management server MS determines and reserves one port 2 (hereinafter, referred to as "port 2x") to be used for landing by the UAV 1a among the plurality of ports 2a to 2d on the basis of the reservation status of each of the plurality of ports 2a to 2d by the other UAV 1 different from the UAV 1a, and the priority order of each of the plurality of ports 2a to 2d by the UAV 1a. In other words, among the plurality of ports 2a to 2d, the port 2x that is not reserved by the other UAV 1 and has the highest priority order by the UAV 1a is determined and reserved. By this configuration, the reservation information of the port 2x used for landing by the UAV 1a is stored.

When the reservation is completed, flight control information of the UAV 1a is transmitted from the management server MS to the control server CS together with the aircraft ID of the UAV 1a. The flight control information is information necessary for executing the flight control of the UAV 1a. The flight control information includes, for example, the port IDs of the plurality of ports 2a to 2d selected as landing candidates of the UAV 1a to be flight-controlled, the priority order of the plurality of each of ports 2a to 2d by the UAV 1a, the port information of each of the plurality of ports 2a to 2d, and ON/OFF setting information. Moreover, when the reservation for the port 2x is completed, reservation completion information indicating that the reservation is completed is transmitted from the management server MS to the delivery processing server DS. The reservation completion information includes the port ID of the reserved port 2x. When receiving the reservation completion information from the management server MS, the delivery processing server DS acquires the name and the position information of the port 2x corresponding to the port ID included in the received reservation completion information. Then, the delivery processing server DS transmits a mail (or short mail) describing the cargo delivery information including the name and the position information of the reserved port 2x to a mail address (or telephone number) of the delivery requester. By this configuration, on the display D of the delivery requester's mobile terminal T, information indicating that delivery of the requested cargo is to be started is displayed together with the name and the position information of the reserved port 2x. Incidentally, a message (for example, an HTTP message) describing the cargo delivery information may be transmitted to the delivery requester's mobile terminal T (an application such as a browser).

Next, when the control server CS receives the flight control information from the management server MS, the control server CS determines whether the port change function is set to ON on the basis of the ON/OFF setting information included in the flight control information (Step S5). In a case where the control server CS determines that the port change function is set to ON (Step S5: YES), the control server CS proceeds to Step S6. On the other hand, in a case where the control server CS determines that the port change function is not set to ON (Step S5: NO), the control server CS proceeds to Step S7. In Step S6, the control server CS determines whether the priority order of the port 2x reserved by the UAV 1a to be flight-controlled is first. Namely, it is determined whether the port 2x reserved by the UAV 1a has the highest usage priority among the plurality of ports 2a to 2d selected as landing candidates of the UAV 1a to be flight-controlled. In a case where the control server CS determines that the priority order of the port 2x reserved by the UAV 1a is first (Step S6: YES), the control server CS proceeds to Step S7. In Step S7, the control server CS controls the UAV 1a to fly toward the reserved port 2x by transmitting instruction information indicating the position of the port 2x reserved by the UAV 1a to the UAV 1a. On the other hand, when the control server CS determines that the priority order of the port 2x reserved by the UAV 1a is not first (in other words, the priority order is second or lower) (Step S6: NO), the process proceeds to Step S8.

In Step S8, among the plurality of ports 2a to 2d selected as landing candidates of the UAV 1a, the control server CS determines the target position Pt to which the UAV 1a is headed on the basis of the position of the port 2x reserved by the UAV 1a and the position of the port 2 with a priority order set higher than the priority order of the port 2x. Herein, in a case where when the port 2x reserved by the UAV 1a is the port 2d, the control server CS determines the target position Pt on the basis of the position of the port 2d and the positions of the ports 2a to 2c in which the priority order higher than the priority order of the port 2d is set. Specifically, a quadrangular gravity center formed on the basis of each position of the ports 2a to 2d is determined as the target position Pt. Next, the control server CS sets the area Ar with the target position Pt as a reference determined in Step S8, which includes the position of each of the plurality of ports 2a to 2d used for determining the target position Pt (Step S9). Specifically, the area Ar is set in a circle with a radius r between the position of the port 2d farthest away from the target position Pt and the target position Pt. Next, the control server CS controls the UAV 1a to fly toward the target position Pt by transmitting the instruction information indicating the target position Pt determined in Step S8 to the UAV 1a (Step S10). When the flight control of the UAV 1a is started, the flight status information indicating that the flight control of the UAV 1a is started is transmitted from the control server CS to the management server MS together with the aircraft ID of the UAV 1a. Thereafter, in a case where the UAV 1a reaches the area Ar, the flight status information indicating that the UAV 1a has reached the area Ar is transmitted from the control server CS to the management server MS together with the aircraft ID of the UAV 1a.

Next, when the management server MS receives the flight status information indicating that the flight control of the UAV 1a has been started from the control server CS, the management server MS starts a loop process of the port cancellation check. When receiving the flight status information indicating that the UAV 1a has reached the area Ar, the management server MS ends the loop process (exit the loop of the port cancellation check). In other words, the port cancellation check is repeatedly executed before the UAV 1a reaches the area Ar (in other words, enters). In the loop process of the port cancellation check, the management server MS performs a port cancellation check (Step S11), and determines whether the reservation of the port 2 with a priority order higher than the priority order of the port 2x reserved by the UAV 1a (that is, the reservation by the other UAV 1) is canceled (Step S12). In a case where the management server MS determines that the reservation of the port 2 with a priority order higher than the priority order of the port 2x is set has not been canceled (Step S12: NO), the management server MS returns to Step S11. On the other hand, in a case where the management server MS determines that the reservation of the port 2 with a priority order higher than the priority order of the port 2x is canceled (that is, the empty of the port 2 with the higher priority order has occurred) (Step S12: YES), the process proceeds to Step S13. In Step S13, instead of the port 2x reserved by the UAV 1a, the management server MS newly determines and reserves (changes the reservation) the port 2 whose reservation has been canceled as the port 2x used for landing by the UAV 1a. By this configuration, the reservation information of the port 2x used for landing by the UAV 1a is changed. Incidentally, in Step S12, the management server MS may determine whether the reservation time of the port 2 set with a priority order higher than the priority order of the port 2x reserved by the UAV 1a (that is, the reservation time by the other UAV 1) has been changed. In this case, the management server MS changes the reservation time of the port 2 with a priority order higher than the priority order of the port 2x. Therefore, in a case where it is determined that the reservation time of the other UAV1 within a predetermined time before and after the reservation date and time included in the reservation request is not included (that is, the port 2 with a high priority order has been emptied), the port 2 whose reservation time has been changed is newly determined and reserved (reservation change) as the port 2x to be used for landing by the UAV 1a, instead of the port 2x reserved by UAV1a.

Then, when the reservation of the port 2x used for landing by the UAV 1a is changed in this way, the flight control information of the UAV 1a is transmitted from the management server MS to the control server CS together with the aircraft ID of the UAV 1a. Moreover, when the reservation of the port 2x is changed, reservation change information indicating that the reservation has been changed is transmitted from the management server MS to the delivery processing server DS. The reservation change information includes the port ID of the port 2x whose reservation has been changed. When receiving the reservation change information from the management server MS, the delivery processing server DS acquires the name and the position information of the port 2x corresponding to the port ID included in the received reservation change information. Then, the delivery processing server DS transmits a mail (or short mail) describing the port change information including the name and the position information of the port 2*x* whose reservation has been changed to the mail address (or telephone number) of the delivery requester. By this configuration, on the display D of the delivery requester's mobile terminal T, information indicating that the receiving port of the cargo requested to be delivered is changed is displayed together with the name and the position information of the port 2*x* whose reservation has been changed. Incidentally, a message describing the port change information (for example, an HTTP message) may be transmitted to the delivery requester's mobile terminal T (an application such as a browser).

After the reservation change of the port 2 is performed in Step S13, when the control server CS receives the flight control information of the UAV 1*a* from the management server MS; the control server CS executes the process of Step S6 again. Namely, it is determined whether the use order of the reserved port 2*x* is first among the plurality of ports 2*a* to 2*d* selected as landing candidates of the UAV 1*a*. Then, when the control server CS determines that the priority order of the port 2*x* whose reservation has been changed is first, the control server CS transmits the instruction information indicating the position of the port 2*x* whose reservation has been changed to the UAV 1*a* to control the UAV 1*a* to fly toward the port 2*x* (Step S7). On the other hand, in a case where the control server CS determines that the priority order of the port 2*x* whose reservation has been changed is not first, determines the target position Pt" to which the UAV 1*a* is headed again on the basis of the position of the port 2*x* whose reservation has been changed among the plurality of ports 2*a* to 2*d* selected as landing candidates of the UAV 1*a* and the position of the port 2 with a priority order higher than the priority order of the port 2*x* (Step S8). Herein, in a case where the port 2*x* whose reservation has been changed is the port 2*c*, the control server CS determines the target position Pt" again on the basis of the position of the port 2*c* and the positions of the ports 2*a* and 2*b* with a priority order higher than the priority order of the port 2*c*. Next, the control server CS sets the area Ar" with the target position Pt" as a reference determined again in Step S8, which includes the position of each of the plurality of ports 2*a* to 2*c* used for redetermining the target position Pt" (Step S9). Next, the control server CS transmits instruction information indicating the redetermined target position Pt" to the UAV 1*a*, thereby controlling the UAV 1*a* to fly toward the target position Pt" (Step S10).

Then, when the control server CS determines that the UAV 1*a* has reached the area Ar or the area Ar", the control server CS transmits the instruction information indicating the position of the finally determined port 2*x* to the UAV 1*a* to control the UAV 1*a* to fly toward the port 2*x* (Step S7). In a case where the flying UAV 1*a* arrives at the port 2*x* and lands, landing information indicating that the UAV 1*a* has landed at the port 2*x* is transmitted from the control server CS to the management server MS together with the aircraft ID of the UAV 1*a*. Then, the landing information is transmitted from the management server MS to the delivery processing server DS. The landing information includes the port ID of the port 2*x* where the UAV 1*a* has landed. When receiving the landing information from the management server MS, the delivery processing server DS acquires the name and the position information of the port 2*x* corresponding to the port ID included in the received landing information. Then, the delivery processing server DS transmits a mail (or short mail) describing the delivery completion information including the name and the position information of the port 2*x* where the UAV 1*a* has landed to the delivery requester's mail address (or telephone number). By this configuration, on the display D of the delivery requester's mobile terminal T, for example, information indicating that the delivery of the requested cargo has been completed is displayed along with the name and the position information of the port 2*x* where the UAV 1*a* has landed. Incidentally, a message (for example, an HTTP message) describing the delivery completion information may be transmitted to the delivery requester's mobile terminal T (an application such as a browser).

FIGS. 15 to 17 are conceptual diagrams illustrating time-series changes (examples 1 to 3) of the flight path of the UAV 1*a* that is flight-controlled during the processing of Steps S6 to S13. Incidentally, in FIGS. 15 to 17, the numbers in the circles representing the ports 2*a* to 2*d* indicate the priority order. FIG. 15 illustrates an example in a case where the reservation of the port 2*d* originally reserved by the UAV 1*a* is not changed. In this case, the UAV 1*a* is flying toward the target position Pt at time points t1 and t2 illustrated in FIG. 15. Thereafter, when the UAV 1*a* reaches the area Ar at time point t3 illustrated in FIG. 15, the UAV 1*a* changes the course and flies toward the port 2*d*. Incidentally, in a case where the flight start position of the UAV 1*a* is within the area Ar due to the wide range of the plurality of ports 2 used for determining the target position Pt, the UAV 1*a* will be assigned to fly toward the originally reserved port 2*d* from the start of flight.

FIG. 16 illustrates an example in which the reservation of the port 2*d* initially reserved by the UAV 1*a* is changed to the port 2*c*. In this case, the UAV 1*a* is flying toward the target position Pt at time point t1 illustrated in FIG. 16. Thereafter, when the target position Pt" is redetermined by changing the reservation of the port 2*d* to the port 2*c* at time point t2 illustrated in FIG. 16, and the area Ar" is reset, the UAV 1*a* changes the course and flies toward the target position Pt". Thereafter, when the UAV 1*a* reaches the area Ar" at time point t3 illustrated in FIG. 16, the UAV 1*a* changes the course and flies toward the port 2*c*.

FIG. 17 illustrates an example in a case where the reservation of the port 2*d* initially reserved by the UAV 1*a* has been changed to the port 2*c*, and the reservation of the port 2*c* has been changed to the port 2*a* (that is, two reservation changes have been made during the flight of the UAV 1*a*). In this case, the UAV 1*a* is flying toward the target position Pt at time point t1 illustrated in FIG. 17. Thereafter, when the target position Pt" is redetermined by changing the reservation of the port 2*d* to the port 2*c* at time point t2 illustrated in FIG. 17 and the area Ar" is reset, the UAV 1*a* changes the course and flies toward the target position Pt". Thereafter, when the reservation of the port 2*c* is changed to the port 2*a* at time point t3 illustrated in FIG. 17, the target position Pt" is not redetermined because the priority of the port 2*a* is first, and the UAV 1*a* changes the course and flies toward the port 2*a*. That is, in this case, the UAV 1*a* changes the course before reaching the area Ar".

As described above, according to the above embodiment, the target position Pt to which the UAV 1*a* is headed among the plurality of UAVs 1 is determined on the basis of the position of each of the plurality of ports 2, and the UAV 1*a* is controlled to fly toward the target position Pt. And then, the port 2*x* to be used for landing of the UAV 1*a* is determined on the basis of the reservation status of each of the plurality of ports 2 by the other UAV 1 different from the UAV 1*a* among the plurality of the UAVs 1 while the UAV 1*a* is flying toward the target position Pt, and the UAV 1*a* is controlled to fly toward the determined port 2*x*. According to above configuration, the UAV 1*a* can be flight-controlled by determining the port 2x used for landing so that the flight efficiency is not lowered as much as possible for the UAV 1a. Therefore, each UAV 1 can use a more suitable port 2x according to the reservation status of each of the plurality of ports 2, and the plurality of ports 2 can be used effectively.

Moreover, according to the above embodiment, the port 2b to be used for landing by the UAV 1a is reserved on the basis of the reservation status of each of the plurality of ports 2 by the other UAV 1 different from the UAV 1a among the plurality of UAVs 1, and the usage priority of each of the plurality of ports 2 by the UAV 1a. While UAV 1a is flying, another port 2a to be used for landing by the UAV 1a is reserved instead of the already reserved port 2b on the basis of the reservation status of each of the plurality of ports 2 by the other UAV 1 different from the UAV 1a and the above usage priority. According to this configuration, it is possible to dynamically change the reservation of the port 2 that is more convenient for a user such as a cargo delivery requester. Therefore, a user such as a cargo delivery requester can use a more suitable port 2 in accordance with the reservation status of each of the plurality of ports 2, and the plurality of ports 2 can be used effectively.

Incidentally, in the above embodiment, the plurality of servers included in the cargo delivery system Sx are configured to execute the process illustrated in FIG. 12, but the process illustrated in FIG. 12 may be executed by one server computer. Moreover, the above-described embodiment has been described about an example in which the technology of the unmanned aerial vehicle system S is applied to the cargo delivery system Sx, but the invention is not limited thereto. If there are the plurality of UAVs 1 and the plurality of ports 2, and each UAV 1 sets the usage priorities for the plurality of ports 2 and uses the ports for landing, this technology can be applied to various cases. For example, the present technology can be applied to a case where the UAV 1a uses the port 2 to charge or replace the battery, or a case where the UAV 1a needs to make an emergency landing, or the like. In such a case, the usage priorities for the plurality of ports 2 may be set in accordance with instructions from the operator of the UAV 1a. Alternatively, the usage priority for the port 2 may be automatically set on the basis of the flight plan of the UAV 1a. For example, the unmanned aerial vehicle system S can automatically set the usage priority for each port 2 on the basis of the flight plan in the cases as described in the following (1) and (2).

(1) When the UAV 1a Needs to Make an Emergency Landing (a) The usage priority of the port 2 is set in an order from the current position of the UAV 1a. According to this configuration, the port 2 that is closer to the current position of the UAV 1a is set to have a higher usage priority, so that the UAV 1a can be urgently landed quickly.

(b) The usage priority of the port 2 is set in an order from the current position of the operator of the UAV 1a. According to this configuration, the port 2 that is closer to the current position of the operator of the UAV 1a is set to have a higher usage priority, so that the operator can quickly collect the UAV 1a.

(2) When Setting a Route that Presupposes Charging or Replacement of the Battery of the UAV 1a in Advance (a) Among the plurality of ports 2 before the battery of the UAV 1a runs out, the usage priority of the port 2 is set in an order closer to the destination. According to this configuration, the port 2 that is closer to the destination of the UAV 1a is set to have a higher usage priority, so the time for the UAV 1a to arrive at the destination can be shortened according to the reservation status of the plurality of ports 2.

(b) The usage priority of the port 2 is set in an ascending order from the straight line directly connecting the departure place and destination of the UAV 1a. According to this configuration, the port 2 that is closer to the straight line has a higher usage priority, so the time for the UAV 1a to arrive at the destination can be shortened according to the reservation status of the plurality of ports 2.

(c) The usage priorities of the ports 2 are set in an ascending order of required estimation time when flying from the departure place of the UAV 1a to the destination via the port 2. According to this configuration, the port 2 with a shorter required estimation time is set to have a higher usage priority, so that it is possible to reduce the time for the UAV 1a to arrive at the destination according to the reservation status of the plurality of ports 2.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention.

REFERENCE SIGNS LIST

1 UAV
2 Port
3 UTMS
4 PMS
11 Drive unit
12 Positioning unit
13 Radio communication unit
14 Imaging unit
15 Control unit
31 Communication unit
32 Storage unit
33 Control unit
33a Aircraft information acquisition unit
33b Port information acquisition unit
33c Target position determination unit
33d Area setting unit
33e Flight control unit
33f Flight status providing unit
41 Communication unit
42 Storage unit
43 Control unit
43a Reservation request receiving unit
43b Reservation processing unit
43c Port information providing unit
CS Control server
MS Management server
DS Delivery processing server
T Mobile terminal
S Unmanned aerial vehicle system

The invention claimed is:

1. A control method executed by a system including a plurality of unmanned aerial vehicles and a plurality of take-off and landing facilities for an unmanned aerial vehicle, the method comprising:
 determining a target position for a first unmanned aerial vehicle among the plurality of unmanned aerial vehicles, the target position defining a provisional waypoint of the first unmanned aerial vehicle, the target position being determined based at least in part on a position of each of the plurality of take-off and landing facilities, the target position being different from a position of each of the plurality of take-off and landing facilities, the position of each of the plurality of take-off and landing facilities being different from a position of a departure place of the first unmanned aerial vehicle;

controlling the first unmanned aerial vehicle to fly toward the target position before determining a destination intended for landing;

determining, while the first unmanned aerial vehicle is flying on a course to the target position, a take-off and landing facility to be used for landing by the first unmanned aerial vehicle among the plurality of take-off and landing facilities based at least in part on a reservation status of each of the plurality of take-off and landing facilities by a second unmanned aerial vehicle different from the first unmanned aerial vehicle among the plurality of unmanned aerial vehicles, the determined take-off and landing facility defining an intended final destination of the first unmanned aerial vehicle; and controlling the first unmanned aerial vehicle to fly toward the determined take-off and landing facility.

2. The control method according to claim 1, further comprising, prior to controlling the first unmanned aerial vehicle to fly toward the target position, setting an area based at least in part on the target position and encompassing the target position, wherein the take-off and landing facility is determined before the first unmanned aerial vehicle enters the area.

3. The control method according to claim 2, wherein the take-off and landing facility is determined when the first unmanned aerial vehicle reaches the area.

4. The control method according to claim 2, wherein the area is set to be centered on the target position and to encompass a position of each of the plurality of take-off and landing facilities.

5. The control method according to claim 2, wherein the area is set to be centered on the target position and to encompass:
  a position of the take-off and landing facility presently reserved as a take-off and landing facility to be used for landing by the first unmanned aerial vehicle, and
  a position of a take-off and landing facility with a usage priority preset for the first unmanned aerial vehicle to be higher than a usage priority of the presently-reserved take-off and landing facility preset for the first unmanned aerial vehicle.

6. The control method according to claim 5, further comprising setting the usage priority of each of the plurality of take-off and landing facilities for the first unmanned aerial vehicle according to an instruction from a delivery requester or a recipient of a cargo delivered to the take-off and landing facility by the first unmanned aerial vehicle.

7. The control method according to claim 5, further comprising setting the usage priority of each of the plurality of take-off and landing facilities for the first unmanned aerial vehicle according to an instruction from an operator of the first unmanned aerial vehicle.

8. The control method according to claim 5, further comprising setting the usage priority of each of the plurality of take-off and landing facilities for the first unmanned aerial vehicle based at least in part on a flight plan of the first unmanned aerial vehicle.

9. The control method according to claim 2, wherein the area is set to be centered on the target position, and is further based at least in part on:
  the take-off and landing facility presently reserved as a take-off and landing facility to be used for landing by the first unmanned aerial vehicle, and
  a distance between the target position and a position of a take-off and landing facility farthest away from the target position among one or more take-off and landing facilities with a usage priority higher than a usage priority of the take-off and landing facility.

10. The control method according to claim 1, wherein the take-off and landing facility to be used for landing by the first unmanned aerial vehicle is determined based further at least in part on:
  the reservation status of each of the plurality of take-off and landing facilities for the second unmanned aerial vehicle, and
  a usage priority of each of the plurality of take-off and landing facilities preset for the first unmanned aerial vehicle.

11. The control method according to claim 1, further comprising:
  reserving a first take-off and landing facility among the plurality of take-off and landing facilities as a take-off and landing facility to be used for landing by the first unmanned aerial vehicle before the first unmanned aerial vehicle flies based at least in part on:
    a reservation status of each of the plurality of take-off and landing facilities for the second unmanned aerial vehicle, and
    a usage priority of each of the plurality of take-off and landing facilities preset for the first unmanned aerial vehicle, each usage priority being preset in value for the first unmanned aerial vehicle prior to a beginning of a flight of the first unmanned aerial vehicle, each usage priority being maintained in value for a duration of the flight, each usage priority defining a preference of the first unmanned aerial vehicle to use the corresponding take-off and landing facility for landing at a conclusion of the flight, the first take-off and landing facility of the plurality of take-off and landing facilities having a first usage priority, a second take-off and landing facility of the plurality of take-off and landing facilities having a second usage priority which defines a higher preference than the first usage priority, the second take-off and landing facility being different from the first take-off and landing facility; and
  changing the reservation, responsive to a change to the reservation status of at least one of the plurality of take-off and landing facilities for the second unmanned aerial vehicle while the first unmanned aerial vehicle is flying, to the second take-off and landing facility, based at least in part on the usage priority of each of the plurality of take-off and landing facilities preset for the first unmanned aerial vehicle, the second take-off and landing facility thereby reserved to be used for landing by the first unmanned aerial vehicle.

12. The control method according to claim 11, wherein in a case where a reservation status of each of the plurality of take-off and landing facilities by the second unmanned aerial vehicle is changed, the second take-off and landing facility is reserved as a take-off and landing facility to be used for landing by the first unmanned aerial vehicle.

13. The control method according to claim 11, wherein in a case where a reservation of a take-off and landing facility with a usage priority higher than a usage priority of the first take-off and landing facility reserved by the first unmanned aerial vehicle is canceled, the take-off and landing facility for which the reservation is canceled is reserved as the second take-off and landing facility.

14. The control method according to claim 1, wherein the target position is determined on the basis of one of:
a midpoint between positions of each of the plurality of take-off and landing facilities, and
a gravity center of an n polygon formed on the basis of the positions of the plurality of take-off and landing facilities, wherein n is an integer of 3 or more.

15. The control method according to claim 1, wherein the target position is determined on the basis of a position of the take-off and landing facility reserved by the first unmanned aerial vehicle, and a position of a take-off and landing facility with a usage priority higher than a usage priority of the reserved take-off and landing facility.

16. A management method executed by a system including a plurality of unmanned aerial vehicles and a plurality of take-off and landing facilities for an unmanned aerial vehicle, the method comprising:
acquiring a usage priority of each of the plurality of take-off and landing facilities for a first unmanned aerial vehicle among the plurality of unmanned aerial vehicles, each usage priority being preset in value for the first unmanned aerial vehicle prior to a beginning of a flight of the first unmanned aerial vehicle, each usage priority being maintained in value for a duration of the flight, each usage priority defining a preference of the first unmanned aerial vehicle to use the corresponding take-off and landing facility for landing at a conclusion of the flight, a first take-off and landing facility of the plurality of take-off and landing facilities having a first usage priority, a second take-off and landing facility of the plurality of take-off and landing facilities having a second preset usage priority which defines a higher preference than the first usage priority, the second take-off and landing facility being different from the first take-off and landing facility;
reserving the first take-off and landing facility as a take-off and landing facility to be used for landing by the first unmanned aerial vehicle based at least in part on:
a reservation status of each of the plurality of take-off and landing facilities for a second unmanned aerial vehicle different from the first unmanned aerial vehicle among the plurality of unmanned aerial vehicles, and
the usage priority of each of the plurality of take-off and landing facilities preset for the first unmanned aerial vehicle; and
changing the reservation, responsive to a change to the reservation status of at least one of the plurality of take-off and landing facilities for the second unmanned aerial vehicle while the first unmanned aerial vehicle is flying, to the second take-off and landing facility, based at least in part on the usage priority of each of the plurality of take-off and landing facilities preset for the first unmanned aerial vehicle, the second take-off and landing facility thereby reserved to be used for landing by the first unmanned aerial vehicle.

17. The management method according to claim 16, wherein in a case where a reservation status of each of the plurality of take-off and landing facilities by the second unmanned aerial vehicle has changed, the second take-off and landing facility is reserved as a take-off and landing facility to be used for landing by the first unmanned aerial vehicle.

18. The management method according to claim 16, wherein in a case where a reservation of a take-off and landing facility with a usage priority higher than a usage priority of the first take-off and landing facility reserved by the first unmanned aerial vehicle is canceled, the take-off and landing facility for which the reservation is canceled is reserved as the second take-off and landing facility.

19. The management method according to claim 16, further comprising determining a target position for the first unmanned aerial vehicle, the target position defining a provisional waypoint of the first unmanned aerial vehicle, the target position being determined based at least in part on a position of each of the plurality of take-off and landing facilities, the target position being different from a position of each of the plurality of take-off and landing facilities, the position of each of the plurality of take-off and landing facilities being different from a position of a departure place of the first unmanned aerial vehicle, the first unmanned aerial vehicle being controlled to fly toward the target position before determining a destination intended for landing, the first take-off and landing facility being reserved while the first unmanned aerial vehicle is flying on a course to the target position.

20. The management method according to claim 19, further comprising, prior to controlling the first unmanned aerial vehicle to fly toward the target position, setting an area based at least in part on the target position and encompassing the target position, wherein the second take-off and landing facility is reserved before the first unmanned aerial vehicle enters the area.

21. The management method according to claim 20, wherein the take-off and landing facility is reserved when the first unmanned aerial vehicle reaches the area.

22. The management method according to claim 20, wherein the area is set to be centered on the target position and to encompass a position of each of the plurality of take-off and landing facilities.

23. The management method according to claim 20, wherein the area is set to be centered on the target position and to encompass:
a position of the first take-off and landing facility reserved by the first unmanned aerial vehicle, and
a position of a take-off and landing facility with a usage priority preset for the first unmanned aerial vehicle to be higher than a usage priority of the first take-off and landing facility preset for the first unmanned aerial vehicle.

24. The management method according to claim 20, wherein the area is set to be centered on the target position, and is further based at least in part on:
the first take-off and landing facility reserved by the first unmanned aerial vehicle, and
a distance between the target position and a position of a take-off and landing facility farthest away from the target position among one or more take-off and landing facilities with a usage priority higher than a usage priority of the first take-off and landing facility.

25. The management method according to claim 19, wherein the target position is determined on the basis of one of:
a midpoint between positions of each of the plurality of take-off and landing facilities, and
a gravity center of an n polygon formed on the basis of the positions of each of the plurality of take-off and landing facilities, wherein n is an integer of 3 or more.

26. The management method according to claim 19, wherein the target position is determined on the basis of a position of the first take-off and landing facility reserved by the first unmanned aerial vehicle, and a position of a take-off and landing facility with a usage priority higher than a usage priority of the first take-off and landing facility.

27. The management method according to claim 16, further including: setting the usage priority for each of the plurality of take-off and landing facilities according to an instruction from a delivery requester or a recipient of a cargo delivered to the take-off and landing facility by the first unmanned aerial vehicle.

28. The management method according to claim 16, further including: setting the usage priority for each of the plurality of take-off and landing facilities according to an instruction from an operator of the first unmanned aerial vehicle.

29. The management method according to claim 16, further comprising setting the usage priority of each of the plurality of take-off and landing facilities for the first unmanned aerial vehicle based at least in part on a flight plan of the first unmanned aerial vehicle.

30. The management method according to claim 16, further comprising changing a flight plan of the first unmanned aerial vehicle according to a reservation status of each of the plurality of take-off and landing facilities by the second unmanned aerial vehicle.

31. A control device provided in a system including a plurality of unmanned aerial vehicles and a plurality of take-off and landing facilities for an unmanned aerial vehicle, the control device comprising:
   at least one memory configured to store program code; and
   at least one processor configured to access the program code and operate as instructed by the program code, the program code including:
      first determination code configured to cause at least one of the at least one processor to determine a target position for a first unmanned aerial vehicle among the plurality of unmanned aerial vehicles, the target position defining a provisional waypoint of the first unmanned aerial vehicle, the target position being determined based at least in part on a position of each of the plurality of take-off and landing facilities, the target position being different from a position of each of the plurality of take-off and landing facilities, the position of each of the plurality of take-off and landing facilities being different from a position of a departure place of the first unmanned aerial vehicle;
      first control code configured to cause at least one of the at least one processor to control the first unmanned aerial vehicle to fly toward the target position before determination of a destination intended for landing;
      acquisition code configured to cause at least one of the at least one processor to acquire take-off and landing facility information indicating a take-off and landing facility to be used for landing by the first unmanned aerial vehicle, the indicated take-off and landing facility defining an intended final destination of the first unmanned aerial vehicle, the indicated take-off and landing facility determined from among the plurality of take-off and landing facilities based at least in part on a reservation status of each of the plurality of take-off and landing facilities by a second unmanned aerial vehicle different from the first unmanned aerial vehicle among the plurality of unmanned aerial vehicles, the indicated take-off and landing facility determined while the first unmanned aerial vehicle is flying on a course to the target position; and
      second control code configured to cause at least one of the at least one processor to control the first unmanned aerial vehicle to fly toward the take-off and landing facility indicated by the take-off and landing facility information.

\* \* \* \* \*